(12) United States Patent
Chen et al.

(10) Patent No.: US 11,620,582 B2
(45) Date of Patent: Apr. 4, 2023

(54) AUTOMATED MACHINE LEARNING PIPELINE GENERATION

(71) Applicant: International Business Machines Corporation, Armonk, NY (US)

(72) Inventors: Bei Chen, Blanchardstown (IE); Long Vu, Chappaqua, NY (US); Syed Yousaf Shah, Yorktwon Heights, NY (US); Xuan-Hong Dang, Chappaqua, NY (US); Peter Daniel Kirchner, Putnam Valley, NY (US); Si Er Han, Xi'an (CN); Ji Hui Yang, Beijing (CN); Jun Wang, Xi'an (CN); Jing James Xu, Xi'an (CN); Dakuo Wang, Cambridge, MA (US); Dhavalkumar C. Patel, White Plains, NY (US); Gregory Bramble, Larchmont, NY (US); Horst Cornelius Samulowitz, White Plains, NY (US); Saket Sathe, Mohegan Lake, NY (US); Chuang Gan, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 16/942,247

(22) Filed: Jul. 29, 2020

(65) Prior Publication Data
US 2022/0036246 A1    Feb. 3, 2022

(51) Int. Cl.
G06N 20/20    (2019.01)
(52) U.S. Cl.
CPC ................... G06N 20/20 (2019.01)

(58) Field of Classification Search
CPC .......... G06N 20/20; G06N 3/04; G06N 3/086; G06N 7/005; G06N 20/10; G06N 5/003; G06N 5/022
See application file for complete search history.

(56) References Cited

U.S. PATENT DOCUMENTS 6,745,150 B1    6/2004 Breiman
8,275,540 B2    9/2012 Downs et al.
(Continued)

FOREIGN PATENT DOCUMENTS

WO    02/39254 A1    5/2002
WO    2020239033 A1    12/2020

OTHER PUBLICATIONS

Mell, Peter, et al. "The NIST Definition of Cloud Computing." National Institute of Standards and Technology. Sep. 2011. 7 pages.
(Continued)

*Primary Examiner* — Abdullahi E Salad
(74) *Attorney, Agent, or Firm* — Amin, Turocy & Watson, LLP

(57) ABSTRACT

Techniques regarding one or more automated machine learning processes that analyze time series data are provided. For example, one or more embodiments described herein can comprise a system, which can comprise a memory that can store computer executable components. The system can also comprise a processor, operably coupled to the memory, and that can execute the computer executable components stored in the memory. The computer executable components can comprise a time series analysis component that selects a machine learning pipeline for meta transfer learning on time series data by sequentially allocating subsets of training data from the time series data amongst a plurality of machine learning pipeline candidates.

20 Claims, 15 Drawing Sheets

(56) References Cited

U.S. PATENT DOCUMENTS

| | | | |
|---|---|---|---|
| 8,972,443 | B2 | 3/2015 | LaRowe et al. |
| 9,195,361 | B1 | 11/2015 | Gil De Paiva et al. |
| 9,727,447 | B1 | 8/2017 | Elgarat |
| 10,387,900 | B2 | 8/2019 | Bledsoe et al. |
| 10,560,313 | B2 | 2/2020 | Sglavo et al. |
| 10,650,928 | B1 | 5/2020 | Larson et al. |
| 10,719,301 | B1 | 7/2020 | Dasgupta et al. |
| 2007/0299798 | A1 | 12/2007 | Suyama et al. |
| 2016/0232457 | A1 | 8/2016 | Gray et al. |
| 2017/0061329 | A1 | 3/2017 | Kobayashi et al. |
| 2017/0116530 | A1 | 4/2017 | Modarresi |
| 2018/0046926 | A1* | 2/2018 | Achin .................. G06N 20/20 |
| 2018/0308231 | A1 | 10/2018 | Kish et al. |
| 2019/0018821 | A1 | 1/2019 | Ormont et al. |
| 2019/0205838 | A1* | 7/2019 | Fang ................ G06Q 10/06398 |
| 2019/0228261 | A1* | 7/2019 | Chan ....................... G06F 8/36 |
| 2019/0362222 | A1 | 11/2019 | Chen |
| 2019/0377984 | A1* | 12/2019 | Ghanta ................ G06K 9/6259 |
| 2019/0384640 | A1 | 12/2019 | Swamy et al. |
| 2019/0392252 | A1* | 12/2019 | Fighel .................. G06K 9/6222 |
| 2019/0392547 | A1 | 12/2019 | Katouzian et al. |
| 2019/0394083 | A1* | 12/2019 | Sglavo ............... H04L 41/0663 |
| 2020/0027210 | A1 | 1/2020 | Haemel et al. |
| 2020/0097810 | A1 | 3/2020 | Hetherington et al. |
| 2020/0097867 | A1 | 3/2020 | Scriven et al. |
| 2020/0111022 | A1* | 4/2020 | Silberman .............. G06N 5/003 |
| 2020/0184327 | A1 | 6/2020 | Dey et al. |
| 2021/0326736 | A1* | 10/2021 | Kishimoto ........... G06K 9/6227 |
| 2021/0390458 | A1* | 12/2021 | Blumstein ................ G06N 3/08 |

OTHER PUBLICATIONS

Laadon, et al. "RankML:MetaLearning-BasedApproachfor Pre-RankingMachineLearningPipelines" arXiv:1911.00108v2 [cs.LG] Nov. 20, 2019. 8 pages.

Feurer, et al. "Chapter 6 Auto-sklearn: Efficient and Robust Automated Machine Learning" F. Hutter et al. (eds.), Automated Machine Learning, The Springer Series on Challenges in Machine Learning, 2019. 22 pages.

Sabharwal, et al. "SelectingNear-OptimalLearnersviaIncrementalDataAllocation" Proceedings of the Thirtieth AAAI Conference on Artificial Intelligence (AAAI-16). 9 pages.

"Cloud AutoML" Google Cloud, https://cloud.google.com/automl, Last Accessed Jul. 8, 2020. 9 pages.

"H2O AutoML" H2O.ai, docs.h2o.ai/h2o/latest-stable/h2o-docs/automl.html, Last Accessed Jul. 8, 2020. 22 pages.

"What is automated machine learning (AutoML)?" Microsoft, https://docs.microsoft.com/en-us/azure/machine-learning/concept-automated-ml, Last Accessed Jul. 8, 2020, 15 pages.

Komer et al., "Hyperopt-Sklearn: Automatic Hyperparameter Configuration for Scikit-Learn" Proc. of the 13th Python in Science Conf. (Scipy 2014). 6 pages.

He et al., "AMC: AutoML for Model Compression and Acceleration on Mobile Devices," Proceedings of the European Conference on Computer Vision (ECCV), arXiv:1802.03494v4 [cs.CV], 2018, 17 pages.

Billman et al., "Automated Discovery in Managerial Problem Formulation: Formation of Causal Hypotheses for Cognitive Mapping," Decision Sciences, vol. 24, Issue 1, 1993, 19 pages.

Wang et al., "Human-AI Collaboration in Data Science: Exploring Data Scientists' Perceptions of Automated AI," Proceedings of the ACM on Human-Computer Interaction, vol. 3, Article 211, arXiv:1909.02309v1 [cs.HC], Nov. 2019, 24 pages.

Drozdal et al., "Trust in AutoML: Exploring Information Needs for Establishing Trust in Automated Machine Learning Systems," Proceedings of the 25th International Conference on Intelligent User Interfaces Companion, arXiv:2001.06509v1 [cs.LG], Mar. 17-20, 2020, 11 pages.

Weidele et al., "AutoAIViz: Opening the Blackbox of Automated Artificial Intelligence with Conditional Parallel Coordinates," Proceedings of the 25th International Conference on Intelligent User Interfaces Companion, arXiv:1912.06723v3 [cs.LG], Mar. 17-20, 2020, 5 pages.

Wang et al., "AutoAI: Automating the End-to-End AI Lifecycle with Humans-in-the-Loop," Proceedings of the 25th International Conference on Intelligent User Interfaces Companion, Mar. 17-20, 2020, pp. 77-78.

Microsoft Azure, https://azure.microsoft.com/en-us/, Last acessed on Jul. 8, 2020, 12 pages.

"Amazon SageMaker," https://aws.amazon.com/sagemaker/, Last acessed on Jul. 8, 2020, 14 pages.

DataRobot, https://www.datarobot.com/, Last acessed on Jul. 8, 2020, 5 pages.

Raza et al. "AutomatedDataExtractionusingPredictiveProgramSynthesis" Association for the Advancement of Artificial ntelligence 2017. 9 pages.

Lee et al. "Accelerating Search-Based Program Synthesis using Learned Probabilistic Models" Association for Computer Machinery 2018. 17 pages.

Khurana et al. "Cognito: Automated Feature Engineering for Supervised Learning" 2016 IEEE 16th International Conference on Data Mining Workshops (ICDMW). 4 pages.

Khurana et al. "Feature Engineering for Predictive Modeling using Reinforcement Learning" arXiv:1709.07150v1 [cs.AI] Sep. 21, 2017. 8 pages.

Lam et al. "Feature Learning From Relational Databases" arXiv:1801.05372v4 [cs.AI] Jun. 15, 2019. 15 pages.

Nargesian et al. "Learning Feature Engineering for Classification" Proceedings of the Twenty-Sixth International Joint Conference on Arlilicial Intelligence (IJCAI-17). 8 pages.

Ellis et al. "Exploring Big Data with Helix: Finding Needles in a Big Haystack" SIGMOD Record, Dec. 2014 (vol. 43, No. 4). 12 pages.

Hassanzadeh et al. "Understanding a Large Corpus of Web Tables Through Matching with Knowledge Bases—An Empirical Study" OM 2015: 25-34. 10 pages.

Yeganeh et al. "Linking Semistructured Data on the Web" Fourteenth International Workshop on the Web and Databases (WebDB2011),Jun. 12, 2011—Athens,Greece. 6 pages.

Lehmberg et al. "Ontology Augmentation Through Matching with Web Tables" http://disi.unitn.it/~pavel/om2018/papers/om2018_LTpaper4.pdf. 2018. 12 pages.

Fokoue et al. "Predicting Drug-Drug Interactions Through Similarity-Based Link Prediction Over Web Data" WWW'16 Companion, Apr. 11-15, 2016, Montréal, Québec, Canada. ACM 978-1-4503-4144— Aug. 16, 2004. 4 pages.

Glass et al. "Inducing Implicit Relations from Text Using Distantly Supervised Deep Nets" The Semantic Web—ISWC 2018 vol. 11136 (17th International Semantic Web Conference, Monterey, CA, USA, Oct. 8-12, 2018, Proceedings, Part I) 18 pages.

"Natural Language Interaction With Automated Machine Learning Systems" U.S. Appl. No. 16/551,021, filed Aug. 26, 2019, 23 pages.

"Personalized Automated Machine Learning" U.S. Appl. No. 16/805,019, filed Feb. 28, 2020, 21 pages.

"Code Generation for Auto-AI" U.S. Appl. No. 16/919,258, filed Jul. 2, 2020, 35 pages.

"Automated Artificial Intelligence Radial Visualization" U.S. Appl. No. 16/557,760, filed Aug. 30, 2019, 61 pages.

Weidele et al., "Conditional Parallel Coordinates in Automated Artificial Intelligence With Constraints" U.S. Appl. No. 16/832,528, filed Mar. 27, 2020, 61 pages.

Wang et al., "Transfer Learning Across Automated Machine Learning Systems" U.S. Appl. No. 16/806,626, filed Mar. 2, 2020, 50 pages.

Office Action for U.S. Appl. No. 16/942,284 dated Apr. 8, 2021, 59 pages.

Santos, et al., "Visus: An Interactive System for Automatic Machine Learning Model Building and Curation," arXiv:1907.02889v1 [cs.LG] Jul. 5, 2019, 7 pages.

Final Office Action received for U.S. Appl. No. 16/942,284 dated Oct. 13, 2021, 98 pages.

Non-Final Office Action received for U.S. Appl. No. 16/942,284 dated Mar. 15, 2022, 36 pages.

List of IBM Patent Applications Treated as Related.

(56) References Cited

OTHER PUBLICATIONS

Final Office Action received for U.S. Appl. No. 16/942,284 dated Oct. 27, 2022, 52 pages.

\* cited by examiner

AUTOMATED MACHINE LEARNING PIPELINE GENERATION

BACKGROUND

The subject disclosure relates to the generation of one or more automated machine learning pipelines, and more specifically, to automated machine learning pipeline generation for the analysis of time series data.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatuses and/or computer program products that can automate the generation of machine learning pipelines based on one or more characteristics of time series data are described.

According to an embodiment, a system is provided. The system can comprise a memory that can store computer executable components. The system can also comprise a processor, operably coupled to the memory, and that can execute the computer executable components stored in the memory. The computer executable components can comprise a time series analysis component that can select a machine learning pipeline for meta transfer learning on time series data by sequentially allocating subsets of training data from the time series data amongst a plurality of machine learning pipeline candidates.

According to an embodiment, a computer-implemented method is provided. The computer-implemented method can comprise selecting, by a system operatively coupled to a processor, a machine learning pipeline for meta transfer learning on time series data by sequentially allocating subsets of training data from the time series data amongst a plurality of machine learning pipeline candidates.

According to an embodiment, a computer program product for generating an automated machine learning process that analyzes time series data is provided. The computer program product can comprise a computer readable storage medium having program instructions embodied therewith. The program instructions can be executable by a processor to cause the processor to select, by the processor, a machine learning pipeline for meta transfer learning on time series data by sequentially allocating subsets of training data from the time series data amongst a plurality of machine learning pipeline candidates.

DETAILED DESCRIPTION

Figure 1:
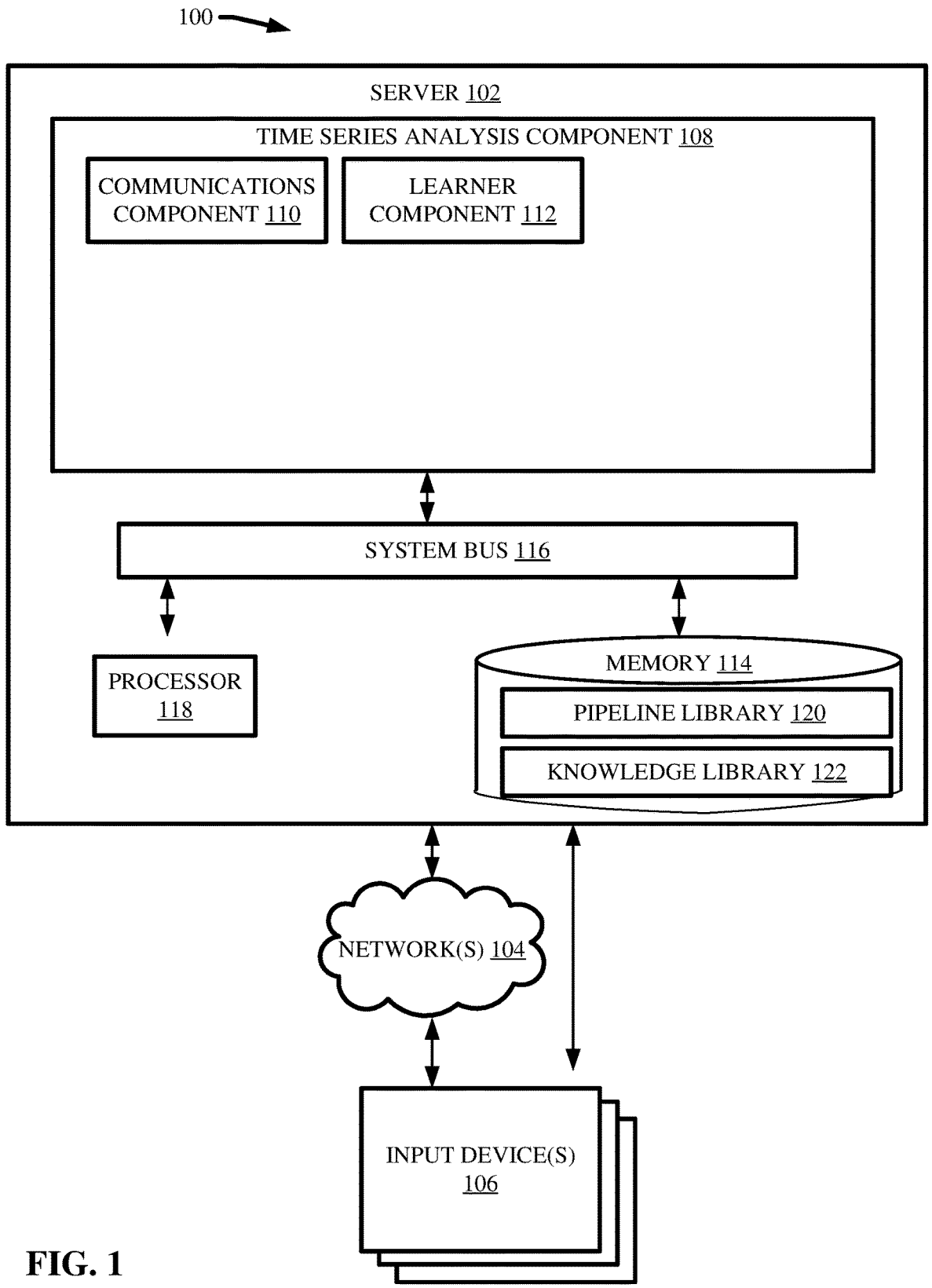
FIG. 1 illustrates a block diagram of an example, non-limiting system that can select one or more machine learning pipelines to conduct a time series data analysis using meta transfer learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Machine learning models can be employed to leverage artificial intelligence systems to learn lessons from defined datasets and facilitate data predictions, correlations, classifications, and/or the like. Traditionally, data scientists generate the machine learning models based on the data to be analyzed and the task to be completed. The data scientists can utilize their technical experience to provide insights regarding the choice of model and/or the feature generation used in the model. However, the expertise of data scientists is not generally available to all applications. Further, attempts to automate the generation of machine learning models can be computationally costly and/or time consuming.

Various embodiments of the present invention can be directed to computer processing systems, computer-implemented methods, apparatus and/or computer program products that facilitate the efficient, effective, and autonomous (e.g., without direct human guidance) generation of machine learning pipelines for time series data analysis. For example, in one or more embodiments described herein can utilize meta transfer learning to select one or more established machine learning pipelines for optimization and/or alteration to complete a machine learning task related to time series data. In some examples, the one or more machine learning pipelines can be associated with one or more defined use cases, wherein data correlations specific to a context of the use case can be known and utilized expedite the machine learning.

In one or more embodiments, the one or more machine learning pipelines can be optimized via a data allocation using upper bound algorithm. For example, subsets of the time series data can be allocated to optimize the transformers and/or estimators of the machine learning pipeline in a chronological order. For instances, older subsets of the time series data that can provide diminishing marginal utility to the optimization can be excluded to expedite the optimization process. In various embodiments, one or more features of the machine learning pipelines can be engineered using one or more knowledge bases. Further, requests for additional data can be generated based on one or more semantic relations defined by the knowledge base. For instance, the requested information can be absent from the time series data but relevant to the machine learning task based on one or more correlations that can be explored by the machine learning pipeline.

In various embodiments, the one or more optimized machine learning pipelines can be assembled and/or ranked as an ensemble of machine learning pipelines. For example, the machine learning task can be executed across the ensemble of machine learning pipelines, wherein respective machine learning pipelines can be assigned weight values to delineate the weight of the outputs. Based on the output of the machine learning pipeline ensemble, one or more embodiments can further provide one or more explanations associated with the results of the machine learning task. For example, the one or more explanations can describe the machine learning pipelines used to complete the machine learning task, lessons derived from the automated machine learning process, correlations between data variables, and/or reasons why a particular result was achieved.

The computer processing systems, computer-implemented methods, apparatus and/or computer program products employ hardware and/or software to solve problems that are highly technical in nature (e.g., automated machine learning pipeline generation), that are not abstract and cannot be performed as a set of mental acts by a human. For example, an individual, or a plurality of individuals, cannot readily analyze a plurality of machine learning models and ascertain the vast number of data correlations learned by each model with the efficiency and/or accuracy of the various embodiments described herein.

Also, one or more embodiments described herein can constitute a technical improvement over conventional automated machine learning by employing transfer learning to leverage lessons learned from past machine learning tasks. Additionally, various embodiments described herein can demonstrate a technical improvement over conventional automated machine learning by employing meta transfer learning in conjunction with a time series data allocation using upper bound algorithm. For example, various embodiments described herein can identify established machine learning pipelines based on characteristics intrinsic to the time series data without executing the entirety of the machine learning pipelines to determine the best compatible candidates.

Further, one or more embodiments described herein can have a practical application by identifying machine learning pipelines compatible with specific use cases associated with the time series data. For instance, various embodiments described herein can utilize one or more data correlations applicable to specific use cases to complete a machine learning task. One or more embodiments described herein can control a feature engineering configuration employed by the machine learning pipelines based on one or more knowledge databases. Thereby, the one or more embodiments, can request additional information absent from the time series data based on known semantic relationships.

As used herein, the term "time series data" can refer to a series of data points indexed in chronological order (e.g., indexed in order of time). For example, the data points can be determined at successive equal or unequal time intervals, wherein the data points can be further time stamped to describe their chronological relation to each other or a defined event. The data points can be collected from one or more sensors, and/or can characterize one or more quantitative properties. For example, the series of data points can characterize one or more properties of a system, device, entity, and/or apparatus being monitored by one or more sensors. The time series data can regard a vast number of properties that are measurable and/or observable by one or more sensors. Example properties that can be characterized by the time series data can include, but are not limited to: temperature, pressure, location, vibration, humidity, moisture content, conductivity, an amount of energy, energy production and/or consumption, luminosity, a combination thereof, and/or the like. In various examples, time series data can characterize the operational status of one or more computer systems (e.g., including the status of hardware, software, network resources, and/or the like) and/or performance metrics of one or more computer program applications (e.g., including the monitoring and/or management of one or more software applications).

As used herein, the terms "machine learning task" and/or "machine learning tasks" can refer to an application of artificial intelligence ("AI") technologies to automatically and/or autonomously learn and/or improve from an experience (e.g., training data) without explicit programming of the lesson learned and/or improved. For example, machine learning tasks can utilize one or more algorithms to facilitate supervised and/or unsupervised learning to perform tasks such as classification, regression, and/or clustering. Execution of a machine learning task can be facilitated by one or more machine learning models trained on one or more datasets in accordance with one or more model configuration settings.

As used herein, the terms "machine learning model" and/or "machine learning models" can refer to a computer model that can be used to facilitate one or more machine learning tasks, wherein the computer model can simulate a number of interconnected processing units that can resemble abstract versions of neurons. For example, the processing units can be arranged in a plurality of layers (e.g., one or more input layers, one or more hidden layers, and/or one or more output layers) connected with by varying connection strengths (e.g., which can be commonly referred to within the art as "weights"). Machine learning models can learn through training, wherein data with known outcomes is inputted into the computer model, outputs regarding the data are compared to the known outcomes, and/or the weights of the computer model are autonomous adjusted based on the comparison to replicate the known outcomes. As used herein, the term "training data" can refer to data and/or data sets used to train one or more machine learning models. As a machine learning model trains (e.g., utilizes more training data), the computer model can become increasingly accurate; thus, trained machine learning models can accurately analyze data with unknown outcomes, based on lessons learning from training data, to facilitate one or more machine learning tasks. Example machine learning models can include, but are not limited to: neural network models, perceptron ("P"), feed forward ("FF"), radial basis network ("RBF"), deep feed forward ("DFF"), recurrent neural network ("RNN"), long/short term memory ("LSTM"), gated recurrent unit ("GRU"), auto encoder ("AE"), variational AE ("VAE"), denoising AE ("DAE"), sparse AE ("SAE"), markov chain ("MC"), Hopfield network ("HN"), Boltzmann machine ("BM"), deep belief network ("DBN"), deep convolutional network ("DCN"), deconvolutional network ("DN"), deep convolutional inverse graphics network ("DCIGN"), generative adversarial network ("GAN"), liquid state machine ("LSM"), extreme learning machine ("ELM"), echo state network ("ESN"), deep residual network ("DRN"), kohonen network ("KN"), support vector machine ("SVM"), neural turing machine ("NTM"), a combination thereof, and/or the like.

As used herein the terms "machine learning pipeline" and/or "machine learning pipelines" can refer to an end-to-end development process for one or more machine learning models. For example, a machine learning pipeline can include one or more steps of: data collection, data cleansing, feature engineering, model selection, parameter optimization, ensemble, model validation, model deployment, run-time monitoring, and/or model improvement.

As used herein, the terms "automated machine learning process" and/or "automated machine learning processes" can refer to the use of software, computer programs, and/or algorithms to generate, develop, and/or optimize one or more machine learning pipelines. For example, automated machine learning can comprise autonomous completion of an end-to-end development process for one or more machine learning models. Automated machine learning systems can autonomously execute one or more machine learning pipelines to generate one or more machine learning models and/or complete one or more machine learning tasks.

FIG. 1 illustrates a block diagram of an example, non-limiting system 100 that can execute one or more machine learning processes to analyze time series data. Repetitive description of like elements employed in other embodiments described herein is omitted for sake of brevity. Aspects of systems (e.g., system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, etc.) can cause the machines to perform the operations described.

As shown in FIG. 1, the system 100 can comprise one or more servers 102, one or more networks 104, and/or input devices 106. The server 102 can comprise time series analysis component 108. The time series analysis component 108 can further comprise communications component 110 and/or learner component 112. Also, the server 102 can comprise or otherwise be associated with at least one memory 114. The server 102 can further comprise a system bus 116 that can couple to various components such as, but not limited to, the time series analysis component 108 and associated components, memory 114 and/or a processor 118. While a server 102 is illustrated in FIG. 1, in other embodiments, multiple devices of various types can be associated with or comprise the features shown in FIG. 1. Further, the server 102 can communicate with one or more cloud computing environments.

The one or more networks 104 can comprise wired and wireless networks, including, but not limited to, a cellular network, a wide area network (WAN) (e.g., the Internet) or a local area network (LAN). For example, the server 102 can communicate with the one or more input devices 106 (and vice versa) using virtually any desired wired or wireless technology including for example, but not limited to: cellular, WAN, wireless fidelity (Wi-Fi), Wi-Max, WLAN, Bluetooth technology, a combination thereof, and/or the like. Further, although in the embodiment shown the time series analysis component 108 can be provided on the one or more servers 102, it should be appreciated that the architecture of system 100 is not so limited. For example, the time series analysis component 108, or one or more components of time series analysis component 108, can be located at another computer device, such as another server device, a client device, etc.

The one or more input devices 106 can comprise one or more computerized devices, which can include, but are not limited to: personal computers, desktop computers, laptop computers, cellular telephones (e.g., smart phones), computerized tablets (e.g., comprising a processor), smart watches, keyboards, touch screens, mice, a combination thereof, and/or the like. The one or more input devices 106 can be employed to enter time series data and/or task parameters into the system 100, thereby sharing (e.g., via a direct connection and/or via the one or more networks 104) said data with the server 102. For example, the one or more input devices 106 can send data to the communications component 110 (e.g., via a direct connection and/or via the one or more networks 104). Additionally, the one or more input devices 106 can comprise one or more displays that can present one or more outputs generated by the system 100 to a user. For example, the one or more displays can include, but are not limited to: cathode tube display ("CRT"), light-emitting diode display ("LED"), electroluminescent display ("ELD"), plasma display panel ("PDP"), liquid crystal display ("LCD"), organic light-emitting diode display ("OLED"), a combination thereof, and/or the like.

In various embodiments, the one or more input devices 106 and/or the one or more networks 104 can be employed to input one or more settings and/or commands into the system 100. For example, in the various embodiments described herein, the one or more input devices 106 can be employed to operate and/or manipulate the server 102 and/or associate components. Additionally, the one or more input devices 106 can be employed to display one or more outputs (e.g., displays, data, visualizations, and/or the like) generated by the server 102 and/or associate components. Further, in one or more embodiments, the one or more input devices 106 can be comprised within, and/or operably coupled to, a cloud computing environment.

For example, the one or more input devices 106 can be employed to enter into the system 100, for instance, but not limited to: time series data, machine learning pipelines, knowledge databases, machine learning tasks (e.g., forecasting, anomaly detection, clustering, regression, classification, prediction, a combination thereof, and/or the like), target predictors to guide one or more predictions, task parameters (e.g., forecasting window, look-back window, the number of machine learning pipelines, external variables, candidate algorithms, a combination thereof, and/or the like), the number of machine learning pipelines to be outputted, machine learning pipeline algorithms, domain of the time series data (e.g., delineating contexts for the data such as financial services, supply chain, transportation, healthcare, education, a combination thereof, and/or the like), runtime thresholds, business key performance index, fairness and bias measures, a combination thereof, and/or the like. For instance, the one or more input devices 106 can be employed to describe a machine learning task to be completed by the automated machine learning process executed by the time series analysis component 108. Further, the one or more input devices 106 can be employed to set one or more runtime thresholds (e.g., describing the maximum amount of time that can be allotted to the automated machine learning process), pipeline thresholds (e.g., describing one or more limitations on which machine learning pipelines can be selected to facilitate the machine learning task), and/or knowledge thresholds (e.g., describing one or more limitations on which knowledge databases can be utilized to facilitate the machine learning task).

In various embodiments, the one or more input devices 106 can also be employed to monitor the progress of the automated machine learning process and/or modulate the progression (e.g., pause, play, and/or stop execution of the automated machine learning process with regards to respective machine learning pipelines and/or machine learning model features). Additionally, the one or more input devices 106 can be employed to receive and/or visualize one or more outputs generated by the time series analysis component 108. Further, the one or more input devices 106 can be employed to set one or more characteristics of the one or more outputs generated by the time series analysis component 108. For example, wherein the time series analysis component 108 can generate an ensemble of machine learning pipelines to execute the machine learning task, the one or more input devices 106 can be employed to delineate the number of machine learning pipelines included in the ensemble. In one or more embodiments, the one or more input devices 106 can include one or more application programming interfaces ("API") to facilitate collection of the one or more inputs to be entered into the system 100.

In one or more embodiments, one or more pipeline libraries 120 can be stored in the one or more memories 114 (e.g., on the one or more servers 102 and/or on one or more external devices associable via the one or more networks 104). The one or more pipeline libraries 120 can include one or more machine learning pipelines that can be employed in one or more automated machine learning process of the time series analysis component 108. For example, the one or more machine learning pipelines included in the pipeline library 120 can be machine learning pipelines developed from past machine learning tasks. For instance, the one or more machine learning pipelines included in the pipeline library 120 can include one or more machine learning models previous trained on one or more datasets. Thereby, the one or more machine learning pipelines included in the pipeline library 120 can include pre-established lessons (e.g., data correlations) that can be leveraged to complete one or more machine learning tasks delineated by the one or more input devices.

Additionally, one or more knowledge libraries 122 can be stored in the one or more memories 114 (e.g., on the one or more servers 102 and/or on one or more external devices associable via the one or more networks 104). The one or more pipeline libraries 120 can include one or more knowledge databases that can be employed in one or more automated machine learning process of the time series analysis component 108. For example, the one or more knowledge databases included in the one or more knowledge libraries 122 can include one or more define semantic relationships between data points and/or machine learning model features.

In various embodiments, the learner component 112 can employ meta transfer learning to identify and/or rank one or more machine learning pipelines for utilization in the automated machine learning process executed by the time series analysis component 108 and described in accordance with various embodiments herein. For example, the learner component 112 can identify one or more machine learning pipelines from the pipeline library 120 to be employed in analyzing the time series data and completing the machine learning task entered into the system 100 via the one or more input devices 106. Wherein the learner component 112 identifies a plurality of machine learning pipelines that can be applicable to analyze the time series data, the learner component 112 can further rank the identified machine learning pipelines in order of expected accuracy. For example, the pipeline library 120 can include 20 machine learning pipelines, wherein the learner component 112 can employ meta transfer learning to identify and rank 3 of the 20 machine learning pipelines for further optimization and/or configuration in the automated machine learning processes executed by the time series analysis component 108.

In one or more embodiments, a machine learning pipeline candidate pool can be the entirety of the pipeline library 120, a subset of the pipeline library 120 (e.g., defined by one or more runtime or pipeline thresholds defined by the one or more input devices 106), and/or a defined set of machine learning pipelines (e.g., wherein the one or more input devices 106 can be employed to target specific machine learning pipelines from the pipeline library 120 for consideration by the learner component 112). Also, in one or more embodiments the number of machine learning pipelines identified and/or ranked by the learner component 112 can be defined by the one or more input devices 106.

The learner component 112 can employ one or more meta transfer learning techniques to identify the one or more machine learning pipelines of interest. For example, previous executions of the candidate machine learning pipelines can result in one or more observations regarding the machine learning pipelines' performance. These observations can be captured as meta-data associated with the machine learning pipelines. The meta-data can regard how well the machine learning pipeline accomplished a given machine learning task with respect to one or more evaluation metrics (e.g., accuracy of predictions and/or classifications). In various embodiments, the meta-data can characterize features of the machine learning pipeline, datasets analyzed by the machine learning pipeline, and/or interdependencies between the machine learning pipelines and the datasets.

For instance, the meta-data can describe one or more features of the previously analyzed datasets, such as, but not limited to: a domain of the dataset, number of datapoints in the dataset, number of attributes, percentage of missing values, the scope of the algorithms to be considered, the candidate algorithm's hyperparameter values, the selection of variables, a combination thereof, and/or the like. In another instance, the meta-data can describe one or more interdependencies determined by the machine learning pipelines from the historical datasets, such as, but not limited to: correlations between various attributes and target values, Pearson correlations between various attributes and aggregations (e.g., average and/or standard deviations), cosine similarity, neural-network based comparison ("CNN"), a combination thereof, and/or the like. In a further instance, the meta-data can characterize a topology of the one or more machine learning pipelines (e.g., via a string of identifiers sequenced based on the flow and/or stages of the machine learning pipelines). For example, machine learning pipeline topology can comprise a collection of algorithms and/or an execution sequence of the algorithms, wherein the topology can be represented by a sequence of words. Each of the algorithms can be represented by an identifier (e.g., a hash), wherein the order of the identifiers can represent the execution sequence of the algorithms. Moreover, the meta-data can describe the type of machine learning task performed by the machine learning pipeline and/or the type of machine learning models generated and/or optimized by the machine learning pipeline (e.g., predictive machine learning models for classification, regression, deep learning, a combination thereof, and/or the like). Thereby the meta-data can describe the structure of the machine learning pipelines, a task of the machine learning pipelines, features of the historic datasets previously analyzed by the machine learning pipelines, and/or performance observations (e.g., determined data correlations) achieved by the machine learning pipelines.

One or more meta transfer learning algorithms executed by the learner component 112 can compare the meta-data of the candidate machine learning pipelines with one or more characteristics of the time series data subject to analysis. To facilitate a comparison of the time series data and the meta-data of the machine learning pipeline candidates, the learner component 112 can execute one or more data pre-processing algorithms for data: cleaning, resampling, balancing, label encoding, missing value imputation, smoothing, filtering, normalizing, detrending, one hot encoding, a combination thereof, and/or the like. Additionally, the learner component 112 can execute one or more feature extraction algorithms to facilitate the comparison. Example operations performed by the one or more feature extraction algorithms can include, but are not limited to: windowing the data, rolling stats, excluding features, a combination thereof, and/or the like. Further, the learner component 112 can execute one or more feature pre-processing algorithms to facilitate the comparison. For example, the one or more feature pre-processing algorithms can include, but are not limited to: a principal component analysis ("PCA"), a synthetic minority over-sampling technique ("SMOTE"), logarithmic cubic algorithms, a combination thereof, and/or the like. Example characteristics of the time series data that can be determined and/or extracted by the learner component 112 can include, but are not limited to: variations in the data, data skewness, kurtosis, data trends, seasonality in the data, a Hurst parameter associated with the data, a combination thereof, and/or the like.

The learner component 112 can compare the meta-data of the machine learning pipelines with the characteristics of the time series data to predict how the respective machine learning pipelines will perform on the time series data. By employing the meta-data in the comparison, the learner component 112 can leverage insights previously developed by the machine learning pipelines to predict one or more performance metrics with regards to the time series data. Thereby, the learner component 112 can identify machine learning pipelines suitable for execution with the time series data without running the machine learning pipeline candidates on the full time series data. In various embodiments, the learner component 112 can identify a machine learning pipeline for further development by the time series analysis component 108, wherein the predicted performance of the machine learning pipeline with respect to the time series data based on the meta-data is greater than a defined threshold with regards to a defined performance metric (e.g., an accuracy metric). In one or more embodiments, the learner component 112 can narrow the field of machine learning pipeline candidates based on the predicted runtime (e.g., determined from the meta-data) associated with the machine learning pipelines in order to meet one or more runtime thresholds defined by the one or more input devices 106.

In one or more embodiments, similarities between the meta-data of a machine learning pipeline and the characteristics of the time series data can be an indication that the machine learning pipeline can accurately perform the desired machine learning task on the time series data. For instance, a machine learning pipeline trained on a dataset with similar characteristics (e.g., as defined by the meta-data) as the time series data can be predicted to perform with a high level a accuracy; thereby contributing to the machine learning pipeline being identified by the learner component 112 for further development by the time series analysis component 108. In another instance, similarities between the machine learning tasks used to train a machine learning pipeline and the machine learning task delineated by the one or more input devices 106 can contribute to the machine learning pipeline being identified by the learner component 112 for further development by the time series analysis component 108.

Additionally, the learner component 112 can rank the identified machine learning pipelines in an order based on the defined evaluation metric. For example, the learner component 112 can rank the identified machine learning pipelines in order based on the predicted accuracy of the machine learning pipelines on the time series data. Example algorithms and/or techniques that can be employed by the learner component 112 to facilitate the ranking can include, but are not limited to: linear regression, support vector machines, decision trees, gradient boost machines, a combination thereof, and/or the like. Wherein the one or more input devices 106 are employed to define the number of machine learning pipelines to be further developed by the time series analysis component 108, the identified machine learning pipelines selected for further development can be based on the ranking and the defined number.

Figure 2:
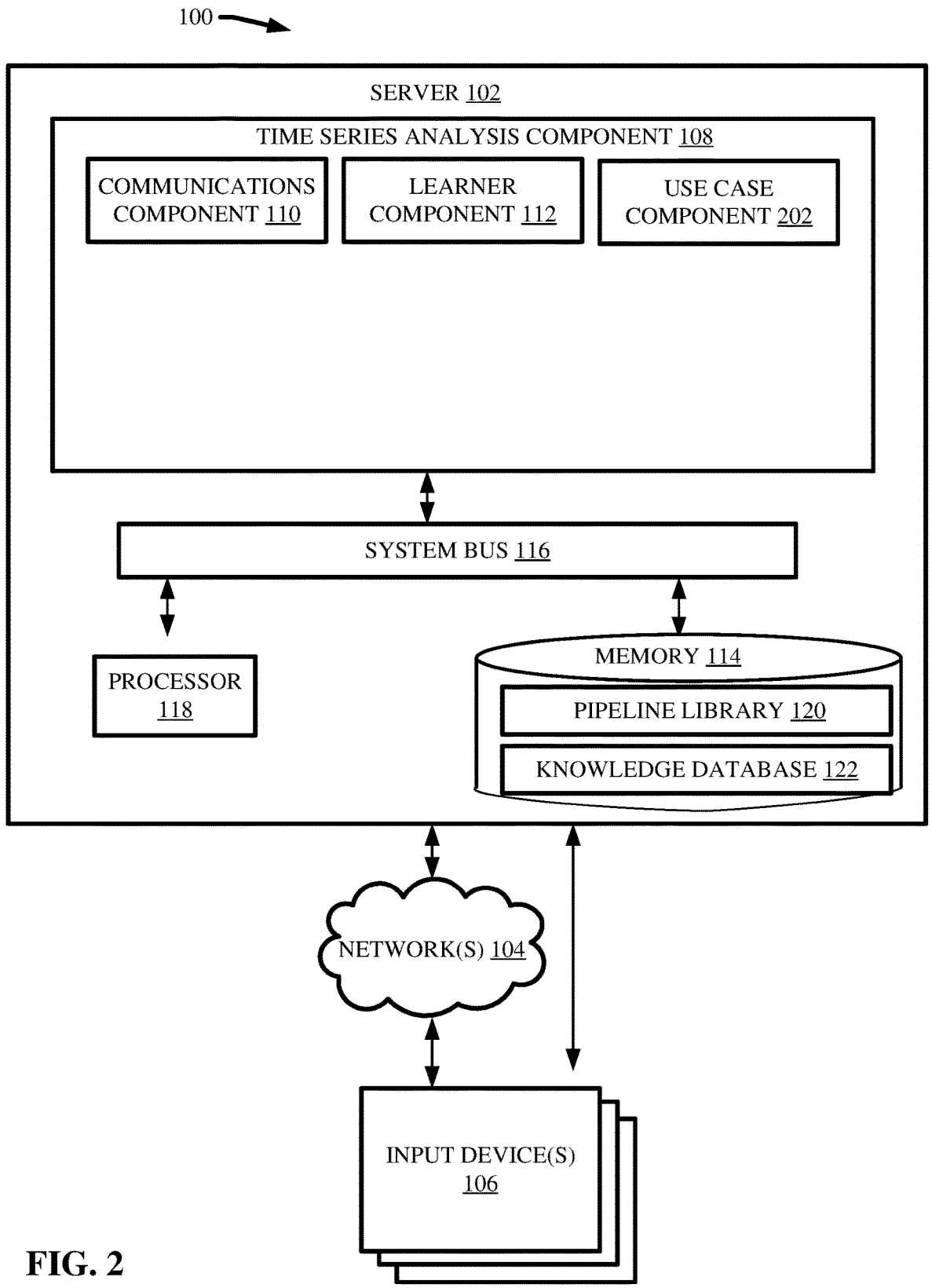
FIG. 2 illustrates a block diagram of an example, non-limiting system that can select one or more use case machine learning pipelines to conduct a time series data analysis based on one or more characteristics of the time series data in accordance with one or more embodiments described herein.

FIG. 2 illustrates a diagram of the example, non-limiting system 100 further comprising use case component 202 in accordance with one or more embodiments described herein. Repetitive description of like elements employed in other embodiments described herein is omitted for sake of brevity. In various embodiments, the use case component 202 can further identify machine learning pipelines for the meta transfer learning based on at least the domain of the time series data. Thereby, the automated machine learning process employed by the time series analysis component 108 can leverage machine learning pipeline insights (e.g., data correlations) inherent to a domain in analyzing time series data of the same, or similar, domain.

In one or more embodiments, one or more of the candidate machine learning pipelines (e.g., from the pipeline library 120) can have been developed and/or trained with regards to particular data domains. Further, respective data domains can experience the same, or similar, data trends and/or interdependencies (e.g., data correlations) across datasets of the domain. Thereby, machine learning pipelines of a data domain can be identified for further consideration and/or ranking by the learner component 112 at least because the time series data is of the same, or similar, data domain. For example, wherein the time series data regards a financial services domain (e.g., credit anomaly detection), the use case component 202 can identify machine learning pipelines (e.g., from the pipeline library 120) that were trained and/or developed on financial service datasets (e.g., for the machine learning task of anomaly detection) for further consideration and/or ranking by the learner component 112. Example domains that can be employed by the use case component 202 to narrow the field of candidate machine learning pipelines can include, but are not limited to: financial services (e.g., credit anomaly detection, quarterly revenue forecasting, label categories classification, value prediction, a combination thereof, and/or the like), energy services (e.g., electricity demand forecast, electricity peak forecasting), weather services (e.g., climate forecasting), healthcare (e.g., medical diagnoses), a combination thereof, and/or the like.

In various embodiments, the domain of the time series data can be defined by the one or more input devices 106. Additionally, or alternatively, the domain of the time series data can be determined by the learner component 112 based on the characteristics of the time series data. In one or more embodiments, the use case component 202 can identify machine learning pipelines based on the machine learning task and/or domain defined and/or determined for the given time series data. In some embodiments, the one or more input devices 106 can be employed to direct the use case component 202 to identify machine learning pipelines of a defined domain. In one or more embodiments, the machine learning pipelines identified and ranked for further development and/or optimization can be restricted by the use case component 202 to only those associated with the one or more target domains, or can include a mixture of machine learning pipelines associated with various domains (e.g., wherein the domain is unknown, machine learning pipeline candidates associated with the target domain are unavailable, to few machine learning pipeline candidates associated with the target domain are available to meet a threshold defined by the one or more input devices 106, and/or the one or more input devices 106 are employed to direct a mixture of domain candidates).

Figure 3:
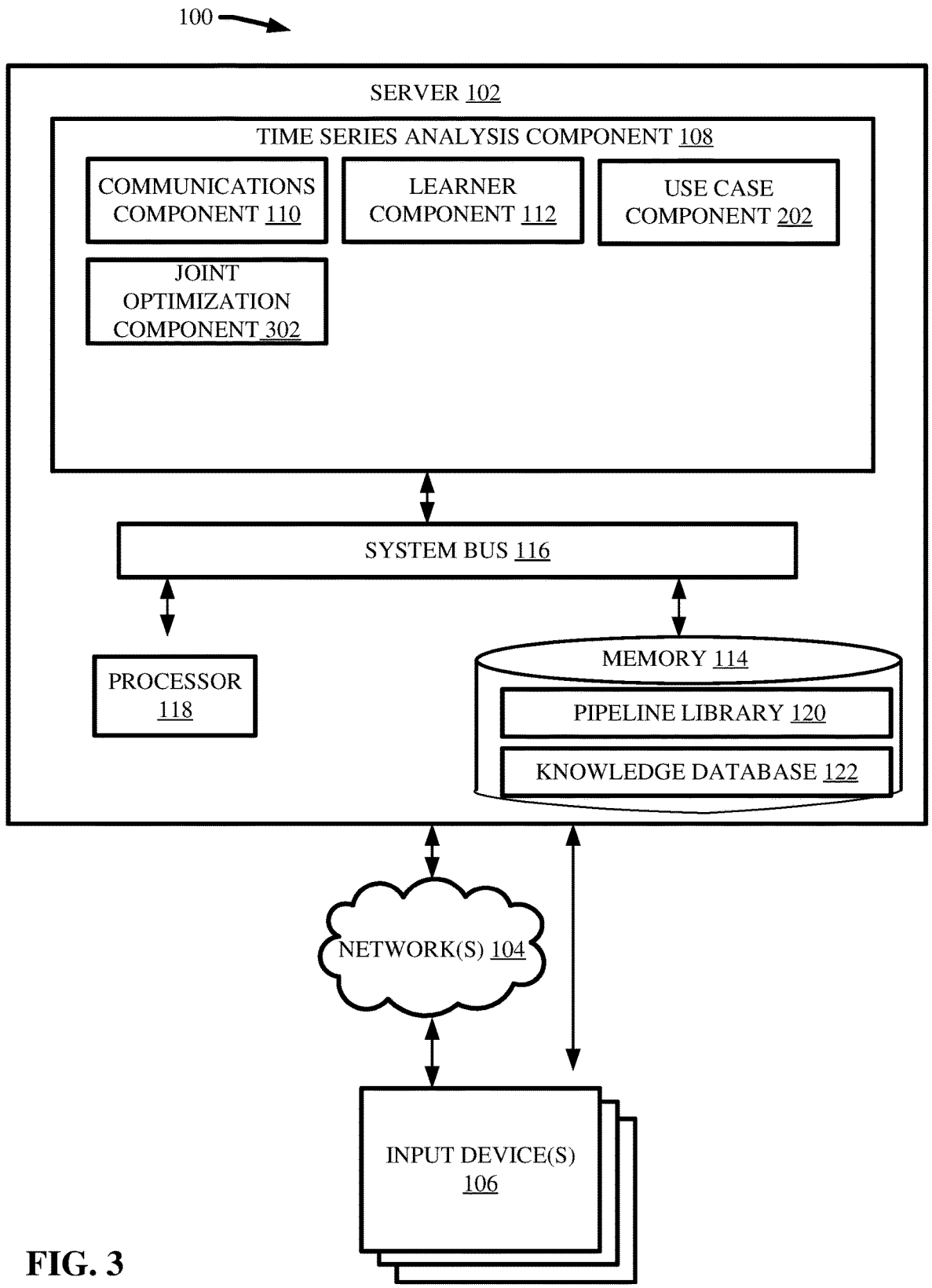
FIG. 3 illustrates a block diagram of an example, non-limiting system that can jointly optimize one or more transformers and/or estimators of selected machine learning pipelines to conduct a time series data analysis using meta transfer learning in accordance with one or more embodiments described herein.

FIG. 3 illustrates a diagram of the example, non-limiting system 100 further comprising joint optimization component 302 in accordance with one or more embodiments described herein. Repetitive description of like elements employed in other embodiments described herein is omitted for sake of brevity. In various embodiments, the joint optimization component 302 can execute a joint optimization algorithm conducted on one or more transformers and/or estimators of the identified machine learning pipelines. Additionally, the joint optimization component 302 can execute a data allocation using upper bound algorithm on the identified machine learning pipelines using one or more subsets of the time series data.

In various embodiments, the joint optimization component 302 can optimize the one or more identified machine learning pipelines via data allocation using upper bound algorithms, alternating direction method of multiplies ("ADMM") algorithms, and/or continuous joint optimization algorithms. For example, the joint optimization component 302 can employ one or more data allocation using upper bound algorithms to optimize the identified machine learning pipelines on subsets of the time series data; rather than optimizations conducted on the entirety of the time series data. The data allocations selected by the joint optimization component 302 can expedite the optimization process as compared to optimizing via the entirety of the time series data. Further, the data allocation can be performed based on the chronological order of data points within the time series data. For example, the data subsets can be sequentially selected from the time series data based on a chronological order of the subset with respect to a plurality of subsets of the time series data (e.g., with respect to the rest of the time series data). For instance, subsets of the time series data can be selected from newest to oldest.

The joint optimization component 302 can employ the one or more data allocation using upper bound algorithms to determine a marginal utility associated with analyzing each subset of the time series data. For example, more recent subsets of the time series data can contribute higher utility to the machine learning pipeline optimization than older subsets of time series data. Once the marginal utility for a data subset reaches a defined threshold, the joint optimization component 302 can determine that the cost (e.g., cost of time and/or computational resources) of analyzing the remaining subsets of the time series data that are older than those subsets already employed in the optimization would be greater than the derived benefit to the machine learning pipeline optimization; thereby, the remaining data subsets can be excluded from the optimization process. Thereby, the joint optimization component 302 can target those subsets of the time series data most beneficial for the machine learning pipeline optimization while conserving computational resources by negating the remaining data subsets.

Additionally, the one or more data allocation using upper bound algorithms can be employed on the identified machine learning pipelines individually. Respective machine learning pipelines can be allocated varying volumes of data subsets from the time series data based on the time series data's compatibility with the machine learning pipeline. For example, wherein a first machine learning pipeline experiences a higher amount of optimization with respect to the time series data than a second machine learning pipeline, the first machine learning pipeline can be allocated more data subsets than the second machine learning pipeline. Thereby, identified machine learning pipelines can be optimized on various amounts of the time series data depending how much each additional increment of time series data contributes to the optimization with respect to the machine learning pipeline. The optimization can differ between the machine learning pipelines due at least in part to differences with regards to: algorithms, hyperparameters values, a combination thereof, and/or the like.

In various embodiments, a joint optimization executed by the joint optimization component 302 can include a fixed data allocation part and a data allocation acceleration part. At a first step of the fixed data allocation part, the joint optimization component 302 can allocate a minimum data subset of the time series data to each identified machine learning pipeline. For example, the data subset can be further split into training and testing sets. The joint optimization component 302 can then train the identified machine learning pipelines on the training set and score the machine learning pipelines on the testing set, wherein the resulting scores can be recorded (e.g., stored in the one or more memories 114). Next, the joint optimization component 302 can allocate an additional data subset of the time series data (e.g., an older data subset) to each identified machine learning pipeline. For example, the additional data subset can be further split into training and testing sets. The joint optimization component 302 can then train the identified machine learning pipelines on the training set and score the machine learning pipelines on the testing set, wherein the resulting scores can be recorded (e.g., stored in the one or more memories 114). Additionally, the joint optimization component 302 can repeatedly allocate additional data subsets and record testing results for a defined number of repetitions.

Once the joint optimization component 302 has allocated the defined number of additional subsets, the joint optimization component 302 can determine a vector of the recorded test scores for each identified machine learning pipeline. For example, the vector can correspond to a sample size as a function of: the minimum allocation size, the size of the additional subset increments, and the number of additional subset increments. Additionally, the joint optimization component 302 can fit a linear regression using the determined vectors to predict a score for each of the identified machine learning pipelines at a target sample size. Thereby, the joint optimization component 302 can predict the performance of the identified machine learning pipelines at a target sample size of the time series data based on the allotted subsets of the time series data, wherein the size of the allotted subsets can be smaller than the target sample size. Further, the joint optimization component 302 can rank the identified machine learning pipelines based on the predicted performance scores at the target sample size. In one or more embodiments, as the predicted score decreases, the predicted accuracy of the machine learning pipeline at the target sample size can increase. The ranking can facilitate the joint optimization component 302 in selecting those machine learning pipelines anticipated to receive the most benefit from further optimization.

During the data allocation acceleration part, the joint optimization component 302 can further optimize priority machine learning pipelines selected from the ranking established based on the fixed data allocation part. For example, one or more machine learning pipelines associated with desirable predicted scores at the target sample size can be allocated additional subsets of the time series data during the data allocation acceleration part. Further, allocation of the additional subsets can increase geometrically. For instance, the geometric allocation acceleration can be a multi-stage process. For each stage, a portion of data can be allocated to the joint optimization algorithm to rank all candidate machine learning model estimator algorithms. In a following stage, the joint optimization component 302 can allocate a new proportion of data to the next subset allocation and re-rank the candidate machine learning model estimators.

For example, the joint optimization component 302 can allocate the next additional data subset to the highest priority machine learning pipeline, as determined by the ranking. The next additional data subset can be further split into training and testing sets. The joint optimization component 302 can then train the machine learning pipeline on the training set and score the machine learning pipeline on the testing set. Further, the joint optimization component 302 can incorporate the resulting score into the vector of the machine learning pipeline and fit a linear regression on the updated vector to determine an updated predicted score at the target sample size. Thereupon, the machine learning pipelines can be re-ranked using that updated predicted score. In one or more embodiments, the data allocation acceleration can be repeated until there are no additional subsets of the time series data to be allocated. In another embodiment, the data allocation acceleration can be repeated until a difference achieved between the predicted score and the updated score of a machine learning pipeline is less than a defined threshold. For example, as the difference between the predicted score and the updated score diminishes, the marginal utility of repeating the data allocation acceleration can likewise diminish, until the benefit rendered by the optimization is outweighed by the cost (e.g., as defined by the difference threshold).

Figure 4:
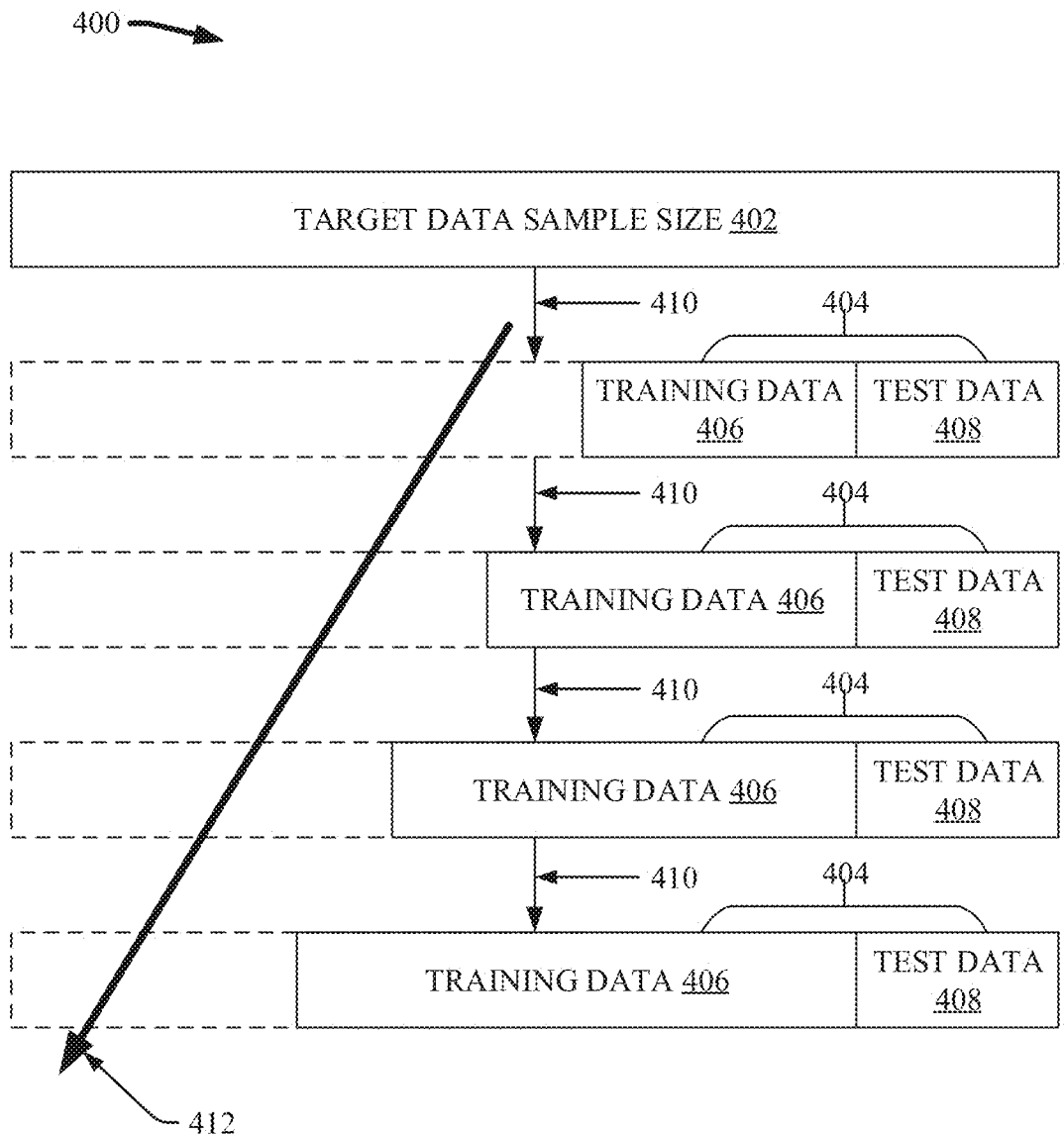
FIG. 4 illustrates a diagram of an example, non-limiting graph that can demonstrate the allocation of one or more subsets of time series data to facilitate the selection and/or optimization of one or more machine learning pipelines in accordance with one or more embodiments described herein.

FIG. 4 illustrates a diagram of an example, non-limiting data allocation scheme 400 that can depict execution of the one or more data allocation using upper bound algorithms that can be performed by the joint optimization component 302 in accordance with one or more embodiments described herein. Repetitive description of like elements employed in other embodiments described herein is omitted for sake of brevity. In various embodiments, the joint optimization component 302 can employ the one or more data allocation using upper bound algorithms to predict how a machine learning pipeline will perform on a target data sample size 402 based on one or more subsets 404 of the data being analyzed. For example, the target data sample size 402 can be the entirety of the time series data, wherein each subset 404 can be a portion of the time series data. In another example, the target data sample size 402 can be a portion of the time series data, wherein each subset 404 can be a segment of the portion of the time series data. The data allocation scheme 400 can be employed during the fixed data allocation and/or data allocation acceleration operations in accordance with various embodiments described herein.

As shown in FIG. 4, the joint optimization component 302 can sequentially allocate subsets 404 of training data 406 to the machine learning pipeline; thereby the one or more data allocation using upper bound algorithms can be executed on the machine learning pipeline level. During, the data allocation acceleration part performed by the joint optimization component 302, data allocation and evaluation can be executed on machine learning pipelines based on a priority in queue defined by the machine learning pipeline ranking.

The dashed lines depicted in FIG. 4 can delineate the remaining data of the target data sample size 402 that is not included in the respective subset 404. The joint optimization component 302 can divide the subsets 404 into training data 406 and test data 408 in accordance with the various embodiments described herein. With each data allocation 410, the joint optimization component 302 can incrementally include more data in the subsets 404. In one or more embodiments, the incremental addition of data can be based on a chronological order of the data (e.g., as delineated by time-stamps in the time series data). For example, most recent data of the time series data can be included in the first subset 404, whereupon the formation of each subsequent subset 404 includes the incremental addition of older and older data (e.g., as compared to the most recent data of the first subset 404).

As described herein, each of the identified machine learning pipelines can be subjected to the data allocation scheme 400, respectively. Also, between each data allocation 410, the joint optimization component 302 can train the machine learning pipeline on the training data 406, and test the machine learning pipeline on the test data 408. Further, the joint optimization component 302 can store the results of each test associated with each data allocation 410 and/or subset 404. Thereupon, the joint optimization component 302 can determine one or more vectors from the stored results and fit a linear regression learning curve 412 to predict the machine learning pipelines performance on the target data sample size 402, despite being trained on a portion (e.g., the collective subsets 404) of the target data sample size 402. In one or more embodiments (e.g., wherein the target data sample size 402 is a portion of the times series data), the joint optimization component 302 can repeat the data allocations 410 and incrementally increase the size of the subsets 404 until the subset is equivalent to the target data sample size 402.

Figure 5:
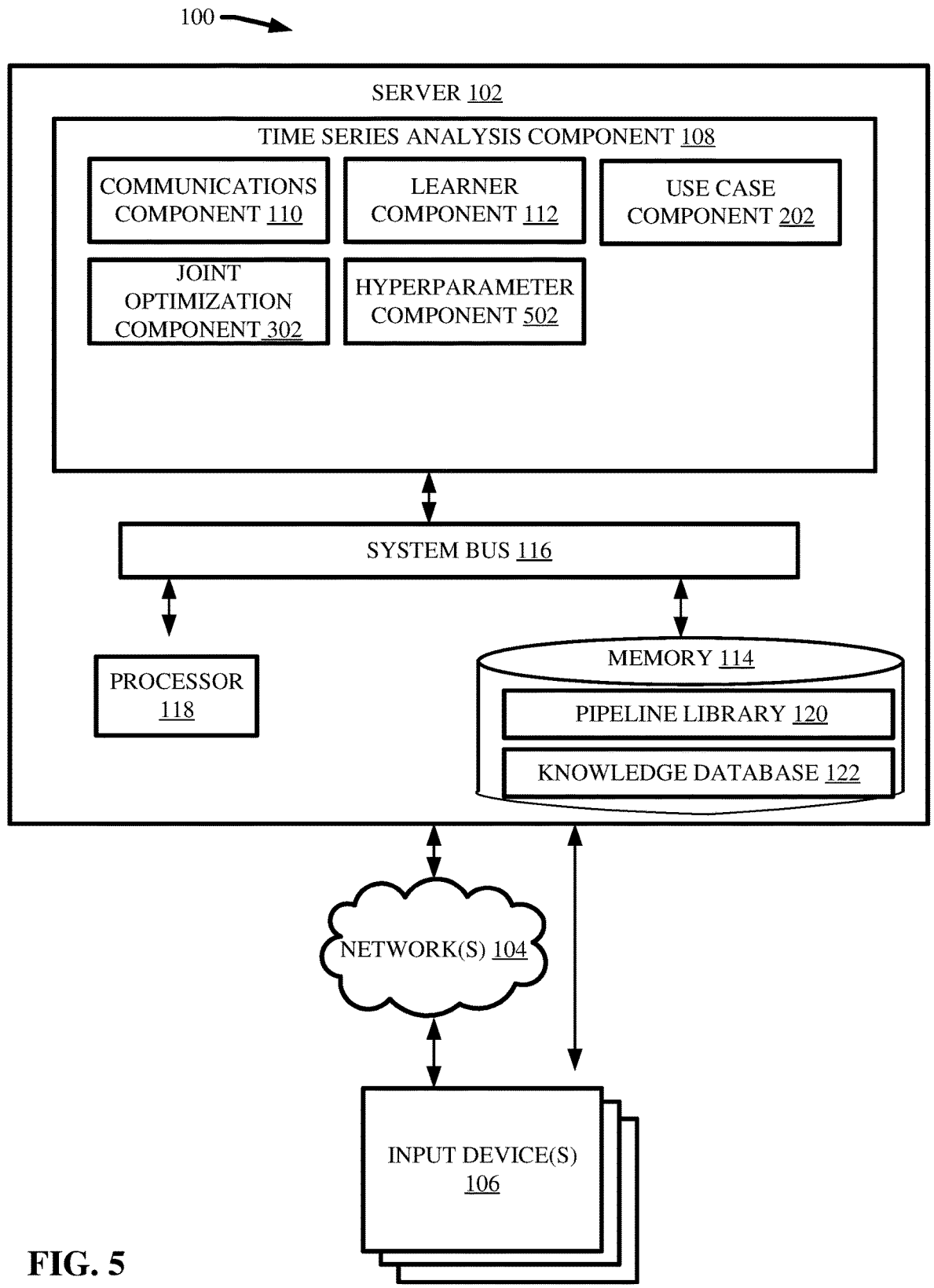
FIG. 5 illustrates a block diagram of an example, non-limiting system that can configure one or more hyperparameters of one or more machine learning pipelines in accordance with one or more embodiments described herein.

FIG. 5 illustrates a diagram of the example, non-limiting system 100 further comprising hyperparameter component 502 in accordance with one or more embodiments described herein. Repetitive description of like elements employed in other embodiments described herein is omitted for sake of brevity. In various embodiments, hyperparameter component 502 can configure one or more hyperparameters employed in the identified machine learning pipelines. Although FIG. 5 depicts the hyperparameter component 502 as separate from the joint optimization component 302, embodiments in which the hyperparameter component 502 is combined with the joint optimization component 302 are also envisaged.

In various embodiments, the hyperparameter component 502 can employ a hyperparameter optimization to select a set of optimal hyperparameters for the identified machine learning pipelines. Thereby, the hyperparameter component 502 can select a set of hyperparameters used to control the automated machine learning process executed by the time series analysis component 108. Example hyperparameter optimization approaches that can be employed by the hyperparameter component 502 can include, but are not limited to: grid search, random search, gradient-based optimization, Bayesian optimization, evolutionary optimization, population-based training, alternating direction method of multipliers ("ADMM"), a combination thereof, and/or the like. For instance, the hyperparameter component 502 can employ a principal component analysis ("CPA") and/or k-nearest neighbors algorithm to automatically configure hyperparameters for the machine learning pipelines.

Figure 6:
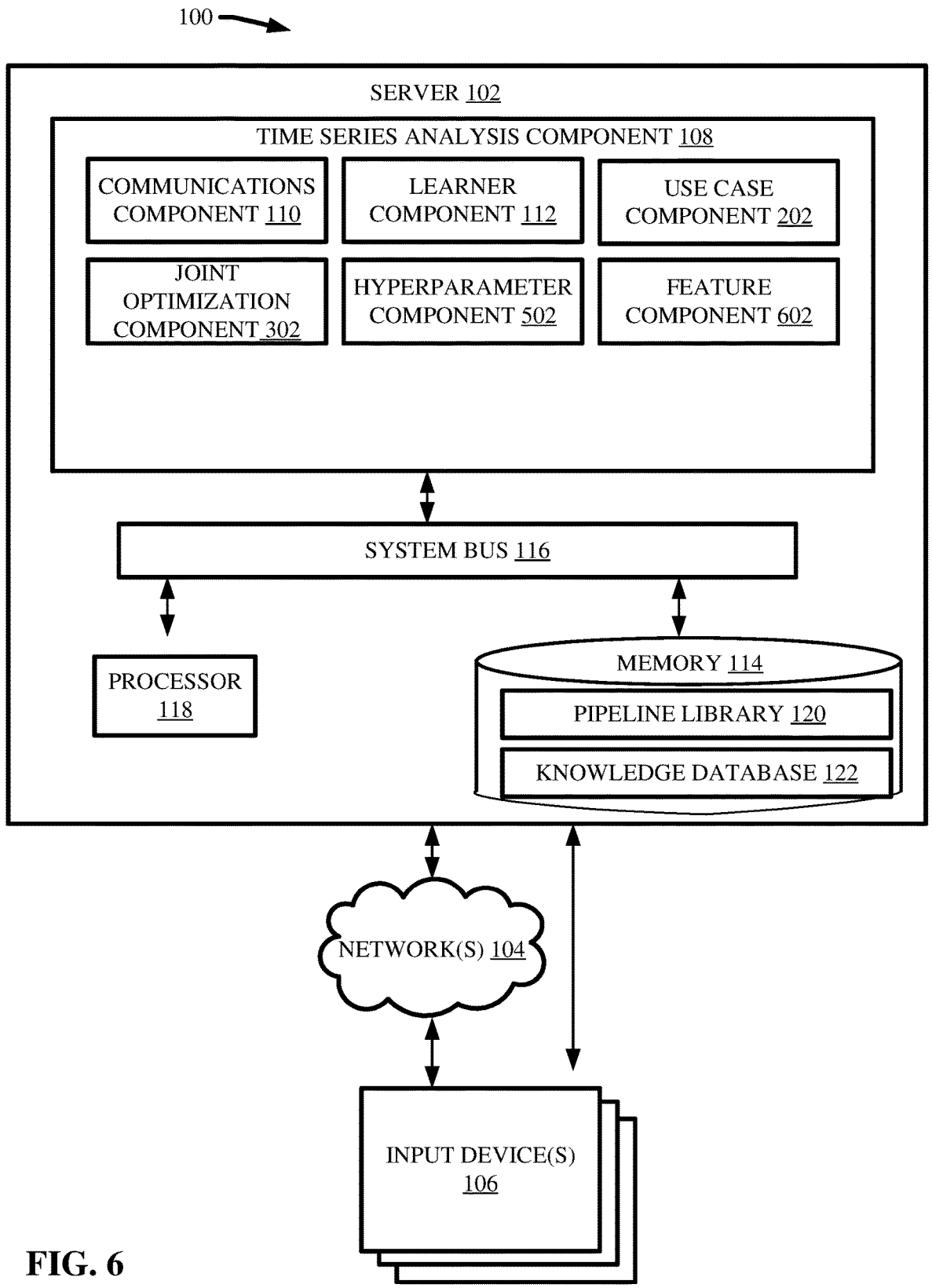
FIG. 6 illustrates a block diagram of an example, non-limiting system that can engineer one or more features of a machine learning pipeline using one or more knowledge databases in accordance with one or more embodiments described herein.

FIG. 6 illustrates a diagram of the example, non-limiting system 100 further comprising feature component 602 in accordance with one or more embodiments described herein. Repetitive description of like elements employed in other embodiments described herein is omitted for sake of brevity. In various embodiments, feature component 602 can engineer one or more features of the identified machine learning pipelines based on one or more semantic relations defined with one or more knowledge databases (e.g., from the knowledge library 122).

In one or more embodiments, the feature component 602 can use semantic relations and rules defined within a knowledge database to define one or more data transformations applicable to the one or more identified machine learning pipelines. For example, the feature component 602 can analyze the knowledge library 122 to select one or more knowledge databases to employ in the feature engineering of the machine learning pipelines. For instance, the feature component 602 can select one or more knowledge databases from the knowledge library 122 based on, but not limited to: a domain of the time series data, tabular data, a combination thereof, and/or the like. As described herein, the knowledge database can include one or more semantic relationships and/or rules that can direct one or more data transformations performed by the feature component 602. For example, the semantic relationships and/or rules can facilitate the feature component 602 in transforming one or more data points of the time series data into one or more formats compatible with identified machine learning pipelines.

In various embodiments, the knowledge database can include one or more semantic relationships (e.g., domain-specific semantic relationships), wherein the feature component 602 can transform one or more data points of the time series data based on a semantic relationship (e.g., domain-specific semantic relationship) from the knowledge database to engineer one or more features for the one or more machine learning pipelines. By leveraging semantic relationship insights defined by the knowledge database, the feature component 602 can engineer features from the time series data that can be employed to leverage meta transfer learning insights from the identified machine learning pipelines to expedite the automated machine learning process executed by the time series analysis component 108.

In one or more embodiments, the knowledge database can further include one or more rules that can direct data transformations by the feature component 602 based on one or more characteristics of the time series data. For example, the feature component 602 can perform one or more of the following data transformation techniques based on one or more rules defined within the or more knowledge databases, including, but not limited to: imputation (e.g., categorical and/or numerical), outlier processing (e.g., outlier detection and/or capping), binning, logarithm transformations, one-hot encoding, grouping operations, feature splitting, feature scaling (e.g., normalization and/or standardization), deletion of data, a combination thereof, and/or the like.

Figure 7:
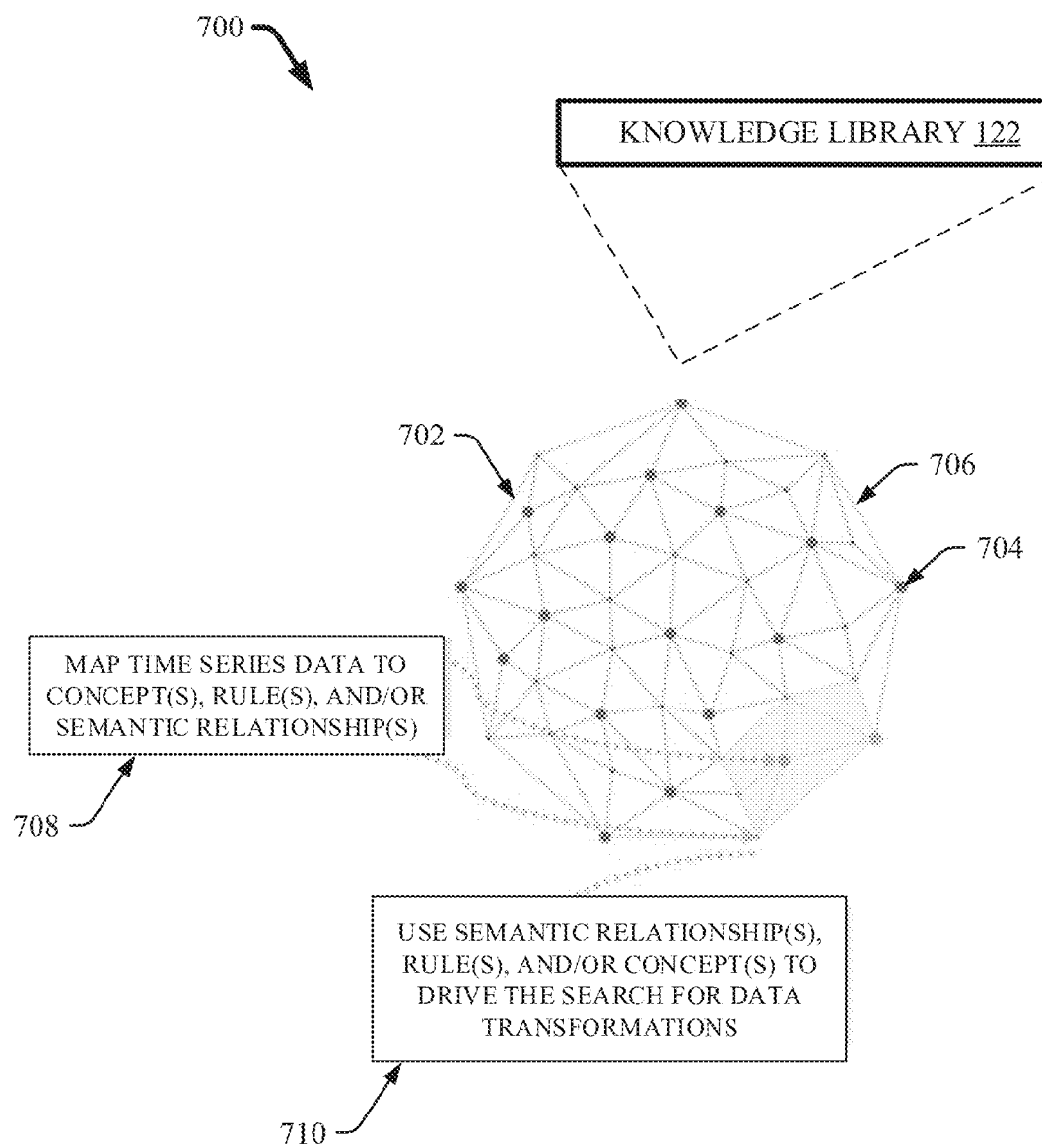
FIG. 7 illustrates a diagram of an example, non-limiting graph that can illustrate one or more semantic relationships defined by one or more knowledge databases in accordance with one or more embodiments described herein.

FIG. 7 illustrates a diagram of an example, non-limiting knowledge database visualization 700 of the feature component 602 engineering features from the time series data based on a knowledge database in accordance with one or more embodiments described herein. Repetitive description of like elements employed in other embodiments described herein is omitted for sake of brevity. As shown in FIG. 7, a knowledge database included in the knowledge library 122 can be represented by a connection scheme 702, wherein a plurality of nodes 704 (e.g., represented by dots in FIG. 7) can be connected via a plurality of edges 706 (e.g., represented by lines in FIG. 7). The nodes 704 can represent historic datapoints, and the edges 706 can represent how the historic datapoints are related to each other.

At 708, the feature component 602 can map the time series data to one or more nodes 704 correlating to one or more concepts, rules, and/or sematic relationships defined by the knowledge database. At 710, the feature component 602 can use the relations between the one or more mapped nodes 704 (e.g., as delineated by the edges 706) to direct one or more data transformations of the time series data and engineer one or more features for the identified machine learning pipelines. For example, FIG. 7 depicts a knowledge database in which the feature component 602 has mapped time series data to the highlighted portion of the connection scheme 702. Based on the nodes 704 and edges 706 of the highlighted portion, the feature component 602 can identify data transformations to be performed. For example, the edges 706 can correlate to data transformations that can be employed with respect to time series data mapped to a respective node 704. By mapping the time series data to the plurality of nodes 704, the feature component 602 can identify known data transformations that can be implemented based on the edges 706 and the data interdependencies established by the edges 706.

Figure 8:
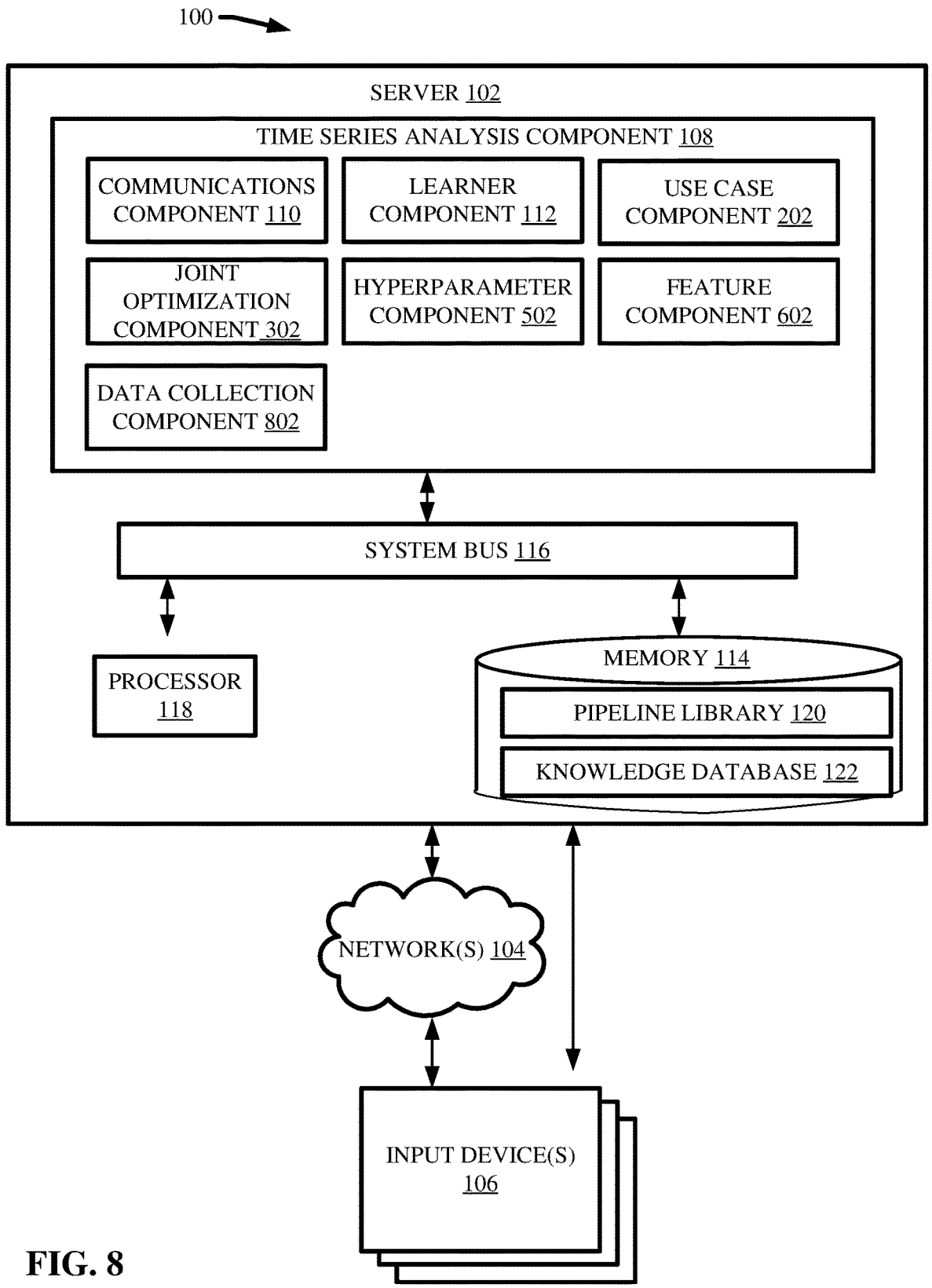
FIG. 8 illustrates a block diagram of an example, non-limiting system that can request additional data to be inputted into the system based on one or more relationships defined within a machine learning pipeline in accordance with one or more embodiments described herein.

FIG. 8 illustrates a diagram of the example, non-limiting system 100 further comprising data collection component 802 in accordance with one or more embodiments described herein. Repetitive description of like elements employed in other embodiments described herein is omitted for sake of brevity. In various embodiments, the data collection component 802 can generate one or more data requests based on one or more data correlations defined by the identified machine learning pipelines and/or knowledge databases. The one or more data requests can regard data relevant to the machine learning task and absent from the time series data.

In one or more embodiments, the data collection component 802 can identify missing data points from the time series data. For instance, the data collection component 802 can identify a missing value that is within the scope of the time series data. For exemplification, consider an instance wherein a measurement included in the time series data is scheduled to be collected each Tuesday; however, the measurement associated with the first Tuesday of the month was not collected. The data collection component 802 can identify the missing data (e.g., determine that the measurement for the first Tuesday of the month is missing) and generate a request for collection of the missing data. The request can be sent to the one or more input devices 106 (e.g., via one or more networks 104), wherein the one or more input devices 106 can present the one or more requests to one or more users employing the system 100. Further, the one or more input devices 106 can be employed to enter the requested missing data into the system 100. Thereby, the data collection component 802 can generate one or more requests that, when fulfilled, can result in the collection of one or more data points missing from the time series data.

In one or more embodiments, the data collection component 802 can generate the one or more requests based on one or more data correlations defined by the identified machine learning pipelines and/or the knowledge databases. The one or more data correlations can define a relationship between a first type of data comprised within the time series data and one or more second types of data not originally intended to be comprised within the time series data and thereby not currently available for analysis by the identified machine learning pipelines. For example, an insight derived from the meta-data of the one or more identified machine learning pipelines can define a correlation between two or more types of data. For instance, a machine learning pipeline can have determined from previous executions on historical datasets that data type "x" can be forecasted when data type "y" and data type "z" occur within a defined interval of time. Wherein the forecasting of data type "x" can contribute to completion of the machine learning task, and data type "y" is included in the time series data but data type "z" is absent from the time series data; the data collection component 802 can request that the data type "z" be supplied to the time series analysis component 108 (e.g., via the one or more input devices 106 and/or networks 104). Thereby, the time series data can be complete, but still lack data relevant to execution of the machine learning task (e.g., as determined by one or more data correlations defined by the one or more machine learning pipelines and/or knowledge databases); and the data collection component 802 can generate one or more requests in an attempt to acquire the lacking data.

Figure 9:
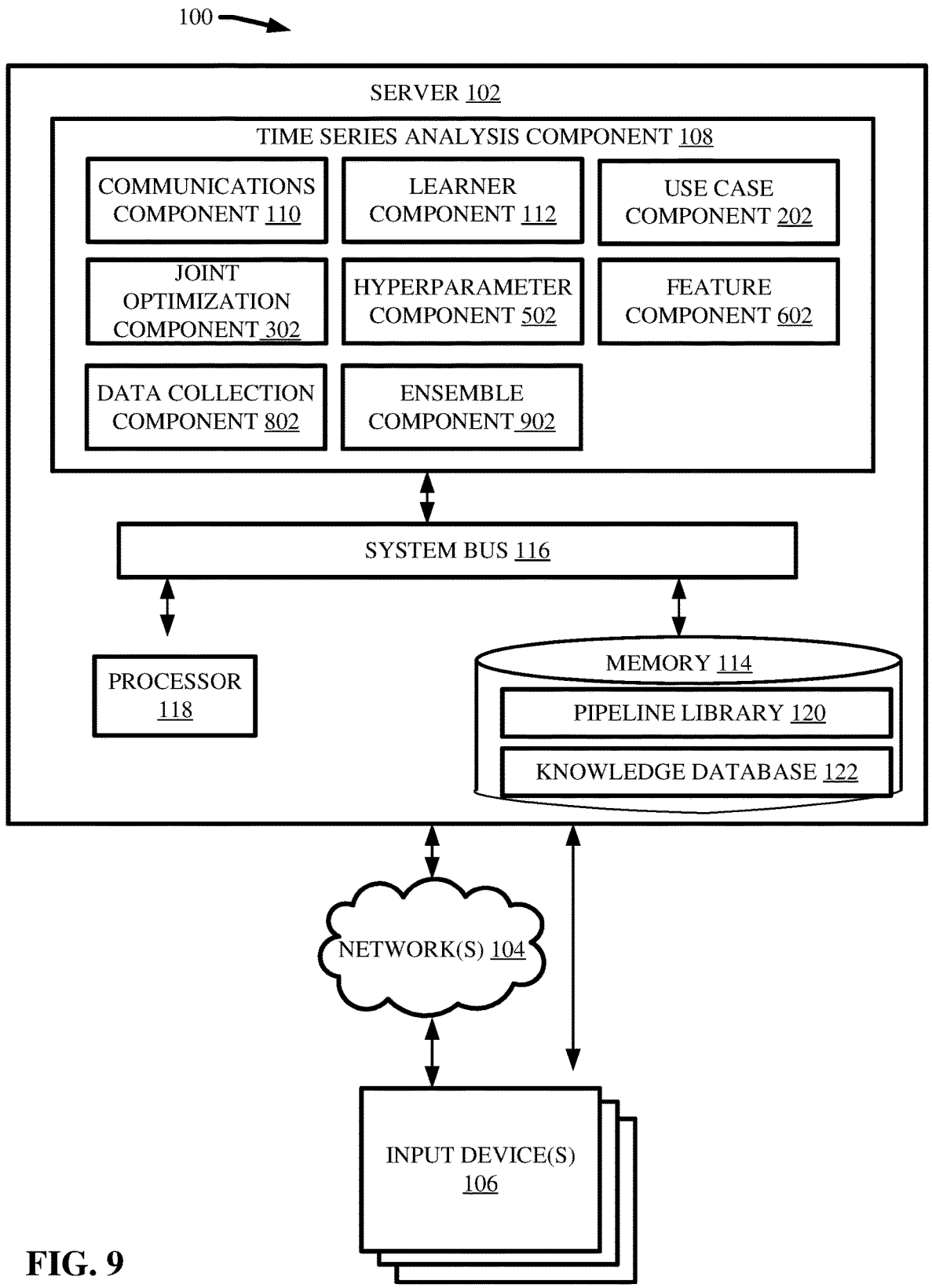
FIG. 9 illustrates a block diagram of an example, non-limiting system that can generate one or more machine learning pipeline ensembles that can be employed to execute a machine learning task regarding time series data in accordance with one or more embodiments described herein.

FIG. 9 illustrates a diagram of the example, non-limiting system 100 further comprising ensemble component 902 in accordance with one or more embodiments described herein. Repetitive description of like elements employed in other embodiments described herein is omitted for sake of brevity. In various embodiments, the ensemble component 902 can generate an ensemble of the machine learning pipelines identified by the meta transfer learning. In various embodiments the ensemble generated by the ensemble component 902 can include the machine learning pipelines identified and/or optimized by the time series analysis component 108.

In one or more embodiments, the ensemble component 902 can assign one or more weights associated with the respective machine learning pipelines of the ensemble. In various embodiments, the one or more outputs achieved by the time series analysis component 108 can be the product of a single machine learning pipeline of the ensemble (e.g., wherein the weights of the other machine learning pipelines of the ensemble are set to zero). In various embodiments, one or more outputs achieved by the time series analysis component 108 can be the product of the machine learning pipeline ensemble as a collective, rather than the product of an individual machine learning pipeline in isolation. Further, the one or more weights can delineate one or more preferences for the outputs of a particular machine learning pipeline, as compared to the other machine learning pipelines of the ensemble, in determining the one or more outputs of the automated machine learning process executed by the time series analysis component 108. Additionally, the ensemble component 902 can assign the one or more weights based on the machine learning task being performed on the time series data and/or one or more evaluation metrics (e.g., defined by the one or more input devices 106) of the machine learning pipelines with regards to executing the machine learning task. Thereby, the ensemble component 902 can vary the weights included in an ensemble of machine learning pipelines from machine learning task to machine learning task even if the machine learning pipelines included in the ensemble remains the same and/or if the time series data remains the same.

Additionally, the ensemble component 902 can define how one or more outputs of the individual machine learning pipelines can be interpreted. For example, wherein the machine learning task is to forecast one or more values based on the time series data, the ensemble component 902 can define the output of the time series analysis component 108 as a collection of the values forecasted by each of the machine learning pipelines in the ensemble. In another example, wherein the machine learning task is to detect anomalies, the ensemble component 902 can define an anomaly as acceptable for output based on majority voting of the machine learning pipelines of the ensemble. For instance, wherein the ensemble includes three machine learning pipelines and only one machine learning pipeline identifies a data point as an anomaly, the ensemble component 902 can determine that the subject data point is not an anomaly based on the majority determination of the ensemble. Likewise, the ensemble component 902 can define majority voting as validation method for a variety of classification tasks.

Figure 10:
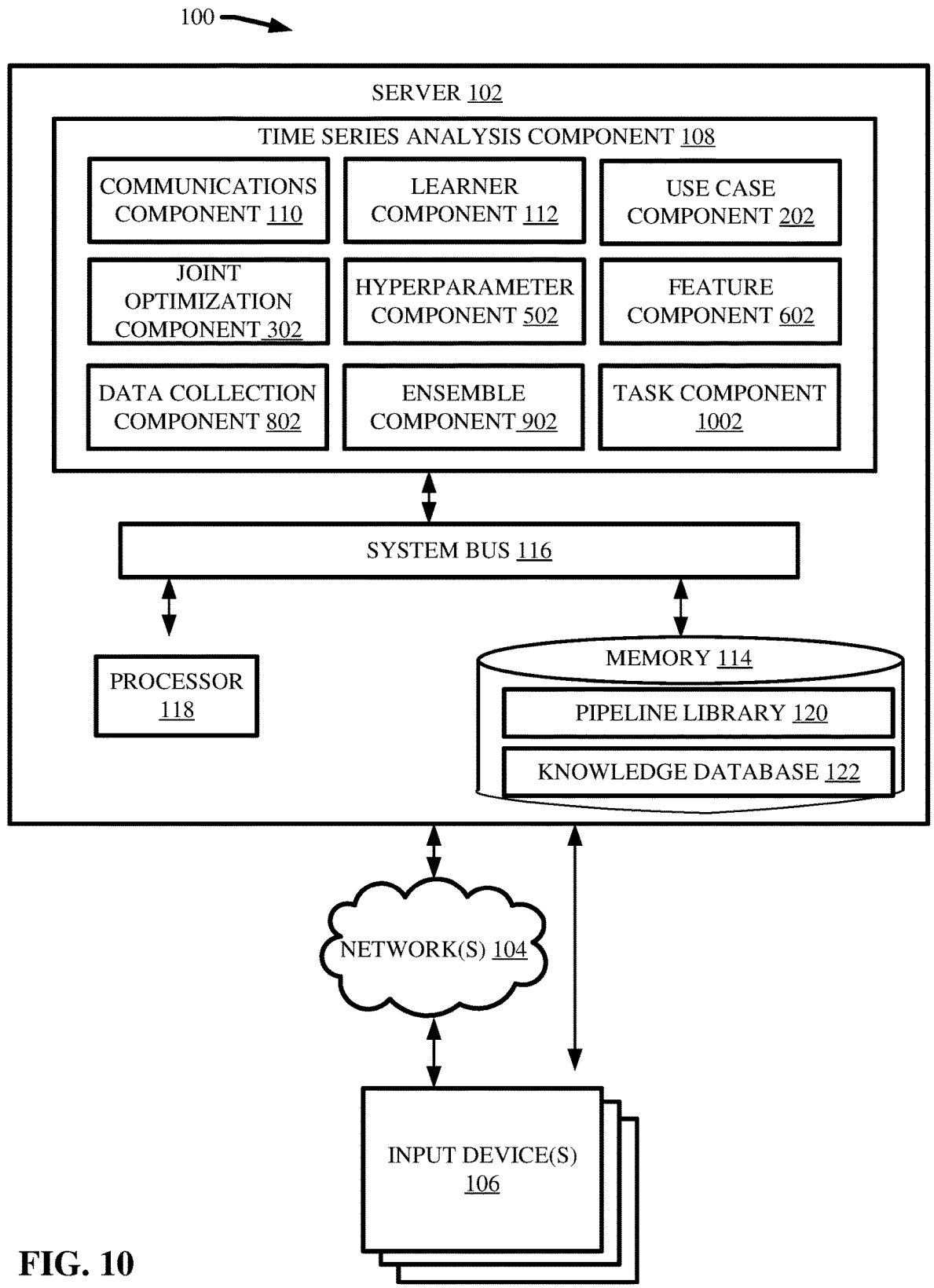
FIG. 10 illustrates a block diagram of an example, non-limiting system that can complete one or more machine learning tasks by employing an ensemble of automatically generated machine learning pipelines in accordance with one or more embodiments described herein.

FIG. 10 illustrates a diagram of the example, non-limiting system 100 further comprising task component 1002 in accordance with one or more embodiments described herein. Repetitive description of like elements employed in other embodiments described herein is omitted for sake of brevity. In various embodiments, the task component 1002 can execute one or more machine learning tasks (e.g., set by the one or more input devices 106) by employing the ensemble of machine learning pipelines. Additionally, the task component 1002 can generate one or more reports that include the outputs of the machine learning task and/or explanations regarding one or more features of the automated machine learning process. The one or more reports can be shared with the one or more input devices 106 via the one or more networks 104.

In various embodiments, the task component 1002 can execute the one or more machine learning tasks on the time series data using the ensemble of identified and/or optimized machine learning pipelines to generate one or more outputs. For example, the one or more outputs can include, but are not limited to: forecasted values, data trend predictions, classifications, anomaly detections, data clusters, a combination thereof, and/or the like. Further, the task component 1002 can output one or more uncertainty values associated with one or more results achieved by the time series analysis component 108.

In one or more embodiments, the task component 1002 can further generate one or more explanations regarding the automated machine learning process executed by the time series analysis component 108. For example, the one or more explanations generated by the task component 1002 can describe how the machine learning pipelines were identified and/or ranked (e.g., by the learner component 112). For instance, the one or more explanations can describe: the size of the candidate pool from which the machine learning pipelines were chosen, the ranking criteria used to establish the ranking, the final ranking results, a combination thereof, and/or the like. In another example, the one or more explanations generated by the task component 1002 can describe one or more meta data insights leveraged by the meta transfer learning, and/or identify the one or more knowledge databases employed in the feature engineering described herein. In a further example, the one or more explanations can describe one or more data processing techniques and/or data transformations performed by the time series analysis component 108. For instance, the one or more explanations can describe one or more outliers in the time series data excluded from analysis.

In various embodiments, the task component 1002 can employ one or more local interpretable model-agnostic explanations ("LIME") algorithms to generate the one or more explanations. Additionally, the one or more explanations generated by the task component 1002 can regard a feature importance ranking (e.g., a ranking of the engineered features based on their impact on the final results of the machine learning task). Moreover, wherein a data outlier is included in the time series data or an additional data collection (e.g., via data collection component 802), the task component 1002 can execute a correlation analysis to determine the impact of the outlier data on the results of the machine learning task. The results of the correlation analysis can be described in the one or more explanations generated by the task component 1002. For instance, the one or more explanations can describe a variation in the results achieved by the time series analysis component 108 caused by the one or more data outliers.

Figure 11:
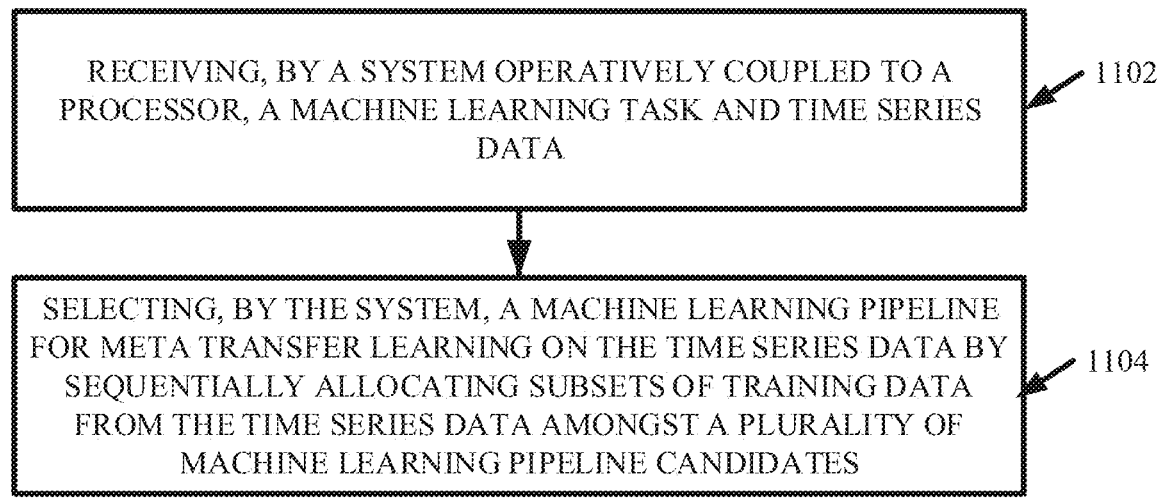
FIG. 11 illustrates a flow diagram of an example, non-limiting method that can facilitate automatic generation of one or more machine learning pipelines for the analysis of time series data in accordance with one or more embodiments described herein.

FIG. 11 illustrates a flow diagram of an example, non-limiting computer-implemented method 1100 that can facilitate one or more automated machine learning processes to analyze time series data in accordance with one or more embodiments described herein. Repetitive description of like elements employed in other embodiments described herein is omitted for sake of brevity.

At 1102, the computer-implemented method 1100 can comprise receiving (e.g., via one or more input devices 106 and/or communications component 110), by a system 100 operatively coupled to a processor 118, one or more machine learning tasks and time series data. For example, one or more input devices 106 can be employed to enter time series data into the system 100 and/or define the one or more machine learning tasks.

At 1104, the computer-implemented method 1100 can comprise selecting (e.g., via learner component 112 and/or joint optimization component 302), by the system 100, one or more machine learning pipelines for meta transfer learning on the time series data by sequentially allocating subsets of training data from the time series data amongst a plurality of machine learning pipeline candidates. In accordance with various embodiments described herein, the one or more machine learning pipelines can be selected from a plurality of machine learning pipelines included in a pipeline library 120 (e.g., stored in one or more memories 114). In one or more embodiments, the machine learning pipelines included in the plurality of machine learning pipeline candidates can be limited (e.g., via use case component 202) to those machine learning pipelines developed on datasets of the same, or similar, domain as the time series data. Additionally, the selecting at 1104 can be based on one or more comparisons between meta-data of the machine learning pipeline candidates and characteristics of the time series data. In various embodiments, the computer-implemented method 1100 can predict the performance of the machine learning pipeline on the time series data based on the allocated training data subsets; thereby reserving further training data allocations to those machine learning pipeline candidates expected to be most compatible with the time series data to complete the machine learning task.

Figure 12:
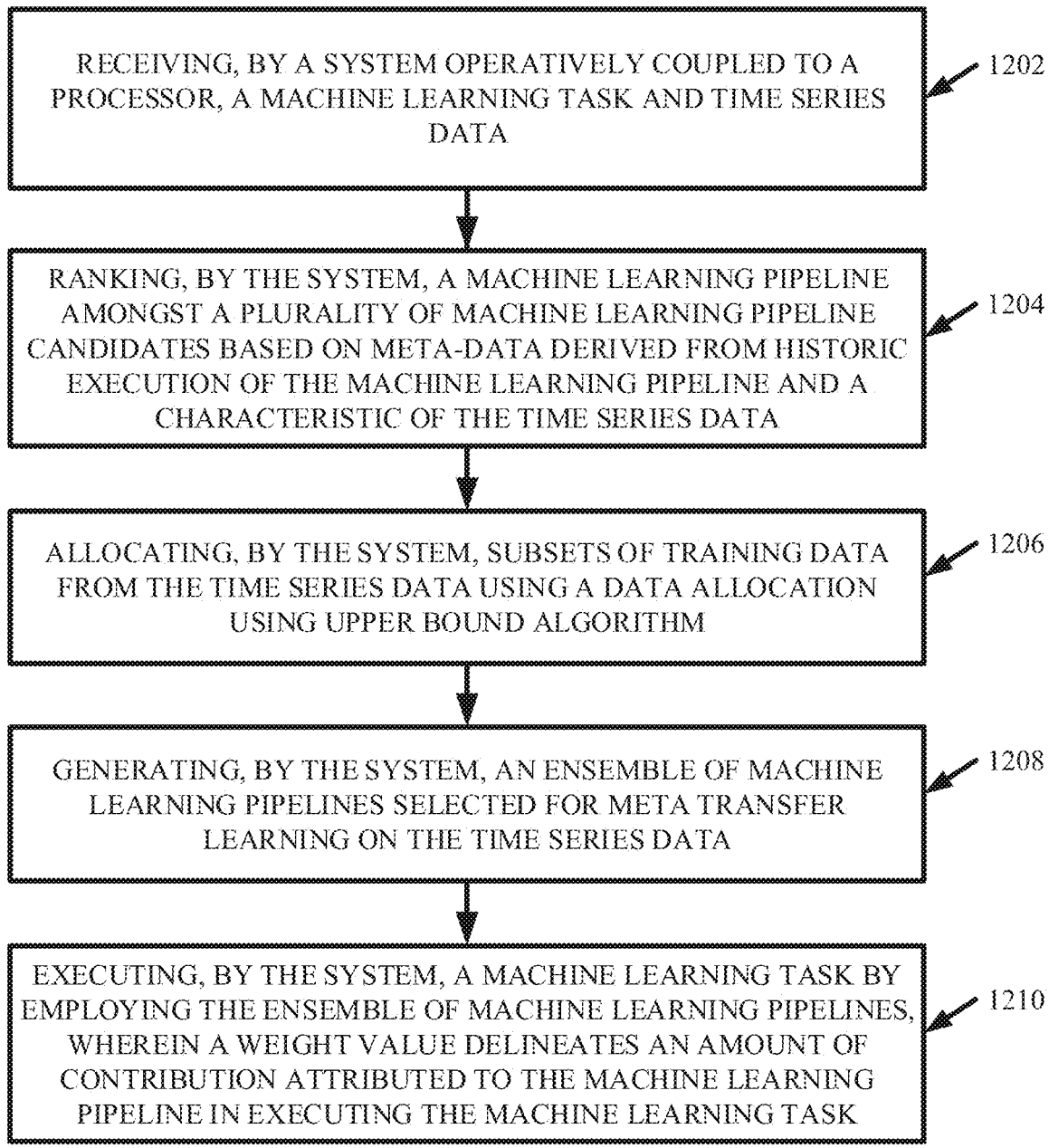
FIG. 12 illustrates a flow diagram of an example, non-limiting method that can facilitate automatic generation of one or more machine learning pipelines for the analysis of time series data in accordance with one or more embodiments described herein.

FIG. 12 illustrates a flow diagram of an example, non-limiting computer-implemented method 1200 that can facilitate one or more automated machine learning processes to analyze time series data in accordance with one or more embodiments described herein. Repetitive description of like elements employed in other embodiments described herein is omitted for sake of brevity.

At 1202, the computer-implemented method 1200 can comprise receiving (e.g., via one or more input devices 106 and/or communications component 110), by a system 100 operatively coupled to a processor 118, one or more machine learning tasks and time series data. For example, one or more input devices 106 can be employed to enter time series data into the system 100 and/or define the one or more machine learning tasks.

At 1204, the computer-implemented method 1200 can comprise ranking (e.g., via learner component 112), by the system 100, one or more machine learning pipelines amongst a plurality of machine learning pipeline candidates based on meta-data derived from historic execution of the one or more machine learning pipelines and one or more characteristics of the time series data. In various embodiments, the ranking at 1204 can be further based on a comparison (e.g., via use case component 202) of the domain of the time series data and the historic datasets used to develop the one or more machine learning pipelines. Moreover, ranking at 1204 can be further based on one or more ranking criteria defined by one or more input devices 106 in accordance with various embodiments described herein. For example, the ranking at 1204 can be further based on a runtime threshold delineating an amount of time allotted to execution of the machine learning task.

At 1206, the computer-implemented method 1200 can comprise allocating (e.g., via joint optimization component 302), by the system 100, subsets of training data from the time series data using one or more data allocation using upper bound algorithms. For example, the allocating at 1206 can include a fixed data allocation and/or a data allocation acceleration in accordance with various embodiments described herein. For instance, the allocating at 1206 can be performed in accordance with the data allocation scheme 400.

At 1208, the computer-implemented method 1200 can comprise generating (e.g., via ensemble component 902), by the system 100, one or more ensembles of machine learning pipelines selected for meta transfer learning on the time series data. For example, the one or more machine learning pipelines can be selected for inclusion in the ensemble at 1208 based on the ranking at 1204 and/or performance results achieved during the training data allocation at 1206. At 1210, the computer-implemented method 1200 can comprise executing (e.g., via task component 1002), by the system 100, the one or more machine learning tasks by employing the one or more ensembles, wherein one or more weight values can delineate an amount of contribution attributed to respective machine learning pipelines in executing the machine learning task. For example, results of the one or more machine learning tasks can be based on the output of multiple machine learning pipelines. For instance, the results of the one or more machine learning tasks can be a collective of multiple machine learning pipeline outputs and/or based on a comparison of outputs generated by various machine learning pipelines of the ensemble (e.g., based on a majority vote by the machine learning pipelines of the ensemble).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
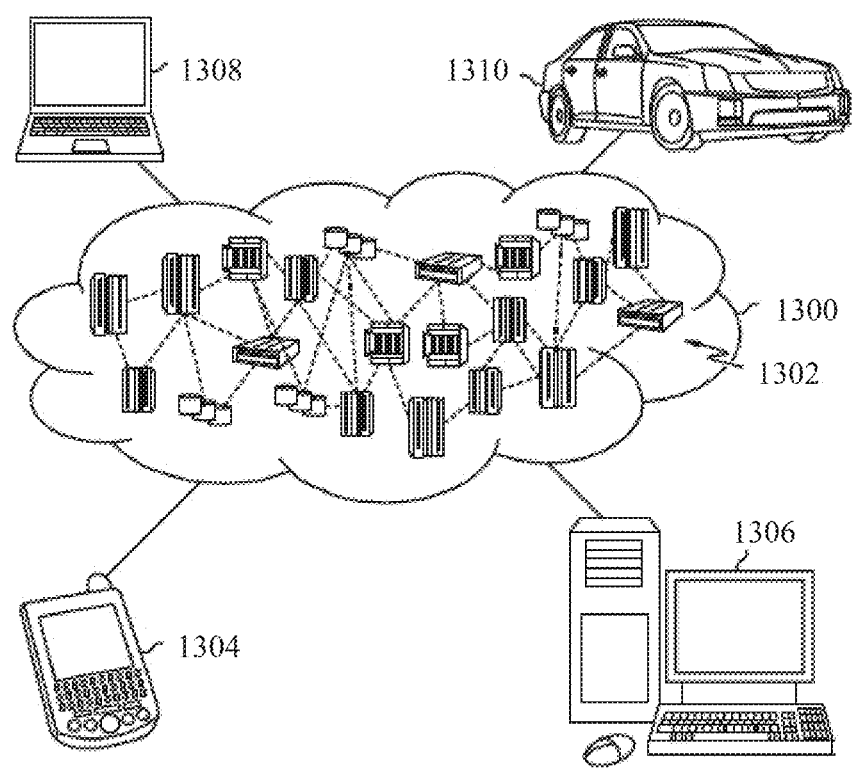
FIG. 13 depicts a cloud computing environment in accordance with one or more embodiments described herein.

Referring now to FIG. 13, illustrative cloud computing environment 1300 is depicted. As shown, cloud computing environment 1300 includes one or more cloud computing nodes 1302 with which local computing devices used by cloud consumers, such as, for example, personal digital assistant (PDA) or cellular telephone 1304, desktop computer 1306, laptop computer 1308, and/or automobile computer system 1310 may communicate. Nodes 1302 may communicate with one another. They may be grouped (not shown) physically or virtually, in one or more networks, such as Private, Community, Public, or Hybrid clouds as described hereinabove, or a combination thereof. This allows cloud computing environment 1300 to offer infrastructure, platforms and/or software as services for which a cloud consumer does not need to maintain resources on a local computing device. It is understood that the types of computing devices 1304-1310 shown in FIG. 13 are intended to be illustrative only and that computing nodes 1302 and cloud computing environment 1300 can communicate with any type of computerized device over any type of network and/or network addressable connection (e.g., using a web browser).

Figure 14:
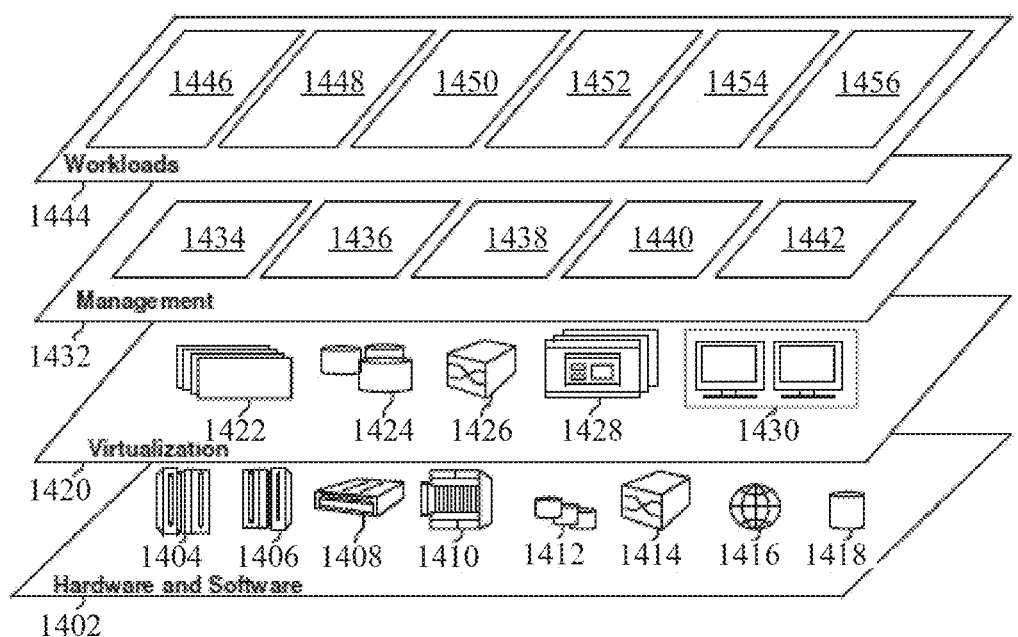
FIG. 14 depicts abstraction model layers in accordance with one or more embodiments described herein.

Referring now to FIG. 14, a set of functional abstraction layers provided by cloud computing environment 1300 (FIG. 13) is shown. Repetitive description of like elements employed in other embodiments described herein is omitted for sake of brevity. It should be understood in advance that the components, layers, and functions shown in FIG. 14 are intended to be illustrative only and embodiments of the invention are not limited thereto. As depicted, the following layers and corresponding functions are provided.

Hardware and software layer 1402 includes hardware and software components. Examples of hardware components include: mainframes 1404; RISC (Reduced Instruction Set Computer) architecture based servers 1406; servers 1408; blade servers 1410; storage devices 1412; and networks and networking components 1414. In some embodiments, software components include network application server software 1416 and database software 1418.

Virtualization layer 1420 provides an abstraction layer from which the following examples of virtual entities may be provided: virtual servers 1422; virtual storage 1424; virtual networks 1426, including virtual private networks; virtual applications and operating systems 1428; and virtual clients 1430.

In one example, management layer 1432 may provide the functions described below. Resource provisioning 1434 provides dynamic procurement of computing resources and other resources that are utilized to perform tasks within the cloud computing environment. Metering and Pricing 1436 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1438 provides access to the cloud computing environment for consumers and system administrators. Service level management 1440 provides cloud computing resource allocation and management such that required service levels are met. Service Level Agreement (SLA) planning and fulfillment 1442 provide pre-arrangement for, and procurement of, cloud computing resources for which a future requirement is anticipated in accordance with an SLA.

Workloads layer 1444 provides examples of functionality for which the cloud computing environment may be utilized. Examples of workloads and functions which may be provided from this layer include: mapping and navigation 1446; software development and lifecycle management 1448; virtual classroom education delivery 1450; data analytics processing 1452; transaction processing 1454; and time series data analyzing 1456. Various embodiments of the present invention can utilize the cloud computing environment described with reference to FIGS. 13 and 14 to select machine learning pipelines for meta transfer learning and/or to leverage meta-data insights in executing one or more machine learning tasks with the selected machine learning pipelines.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware based systems that perform the specified functions or acts or carry out combinations of special purpose hardware and computer instructions.

Figure 15:
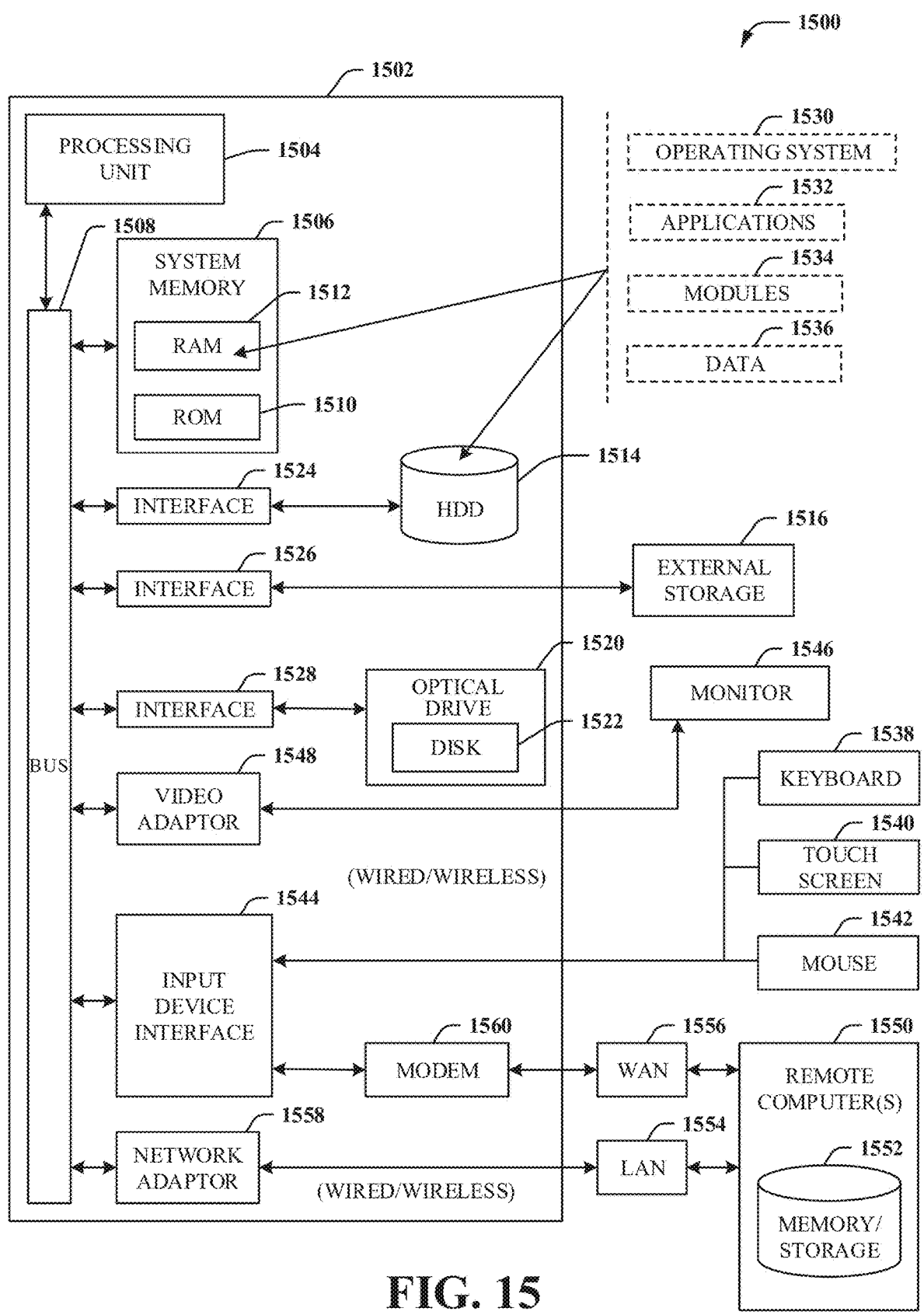
FIG. 15 illustrates a block diagram of an example, non-limiting operating environment in which one or more embodiments described herein can be facilitated.

In order to provide additional context for various embodiments described herein, FIG. 15 and the following discussion are intended to provide a general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things ("IoT") devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory ("RAM"), read only memory ("ROM"), electrically erasable programmable read only memory ("EEPROM"), flash memory or other memory technology, compact disk read only memory ("CD-ROM"), digital versatile disk ("DVD"), Blu-ray disc ("BD") or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system ("BIOS") can be stored in a non-volatile memory such as ROM, erasable programmable read only memory ("EPROM"), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive ("HDD") 1514 (e.g., EIDE, SATA), one or more external storage devices 1516 (e.g., a magnetic floppy disk drive ("FDD") 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid state drive ("SSD") could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus ("USB") and Institute of Electrical and Electronics Engineers ("IEEE") 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine ("VM") of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can be enable with a security module, such as a trusted processing module ("TPM"). For instance with a TPM, boot components hash next in time boot components, and wait for a match of results to secured values, before loading a next boot component. This process can take place at any layer in the code execution stack of computer 1502, e.g., applied at the application execution level or at the operating system ("OS") kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared ("IR") remote control, a radio frequency ("RF") remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network ("LAN") 1554 and/or larger networks, e.g., a wide area network ("WAN") 1556. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point ("AP") disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the Internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity ("Wi-Fi") and BLUETOOTH® wireless technologies. Thus, the communication can be a predefined structure as with a conventional network or simply an ad hoc communication between at least two devices.

What has been described above include mere examples of systems, computer program products and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor, operably coupled to the memory, and that executes the computer executable components stored in the memory, wherein the computer executable components comprise:
      a time series analysis component that selects a machine learning pipeline for meta transfer learning on time series data by sequentially allocating subsets of training data from the time series data amongst a plurality of machine learning pipeline candidates, wherein the time series analysis component comprises:
         a learner component that ranks the machine learning pipeline amongst the plurality of machine learning pipeline candidates based on meta-data derived from historic execution of the machine learning pipeline and a characteristic of the time series data; and
         a joint optimization component that allocates the subsets of training data using a data allocation using upper bound algorithm, wherein a subset of the subsets is selected based on a chronological order of the subset with respect to a plurality of subsets of the time series data.

2. The system of claim 1, wherein the time series analysis component further selects the machine learning pipeline based on a runtime threshold that restricts an amount of time allotted to execution of a machine learning task.

3. The system of claim 1, further comprising:
a use case component that depopulates the plurality of machine learning pipeline candidates based on a domain of the time series data.

4. The system of claim 1, further comprising:
a hyperparameter component that configures a hyperparameter employed in the machine learning pipeline.

5. The system of claim 1, further comprising:
a feature component that engineers a feature of the machine learning pipeline based on a semantic relationship defined within a knowledge database.

6. The system of claim 1, further comprising:
a data collection component that generates a data request based on a data correlation defined by the machine learning pipeline, wherein the data request regards data relevant to a machine learning task and absent from the time series data.

7. The system of claim 1, further comprising:
an ensemble component that generates an ensemble of machine learning pipelines selected for the meta transfer learning, wherein the machine learning pipeline is comprised within the ensemble of machine learning pipelines.

8. The system of claim 7, further comprising:
a task component that executes a machine learning task by employing the ensemble of machine learning pipelines, wherein a weight value delineates an amount of contribution attributed to the machine learning pipeline in executing the machine learning task.

9. A computer-implemented method, comprising:
selecting, by a system operatively coupled to a processor, a machine learning pipeline for meta transfer learning on time series data by sequentially allocating subsets of training data from the time series data amongst a plurality of machine learning pipeline candidates, wherein the selecting comprises:
ranking, by the system, the machine learning pipeline amongst the plurality of machine learning pipeline candidates based on meta-data derived from historic execution of the machine learning pipeline and a characteristic of the time series data; and
allocating, by the system, the subsets of training data using a data allocation using upper bound algorithm, wherein a subset of the subsets is selected based on a chronological order of the subset with respect to a plurality of subsets of the time series data.

10. The computer-implemented method of claim 9, further comprising:
depopulating, by the system, the plurality of machine learning pipeline candidates based on a domain of the time series data.

11. The computer-implemented method of claim 9, further comprising:
generating, by the system, a data request based on a data correlation defined by the machine learning pipeline, wherein the data request regards data relevant to a machine learning task and absent from the time series data.

12. The computer-implemented method of claim 9, further comprising:
generating, by the system, an ensemble of machine learning pipelines selected for the meta transfer learning, wherein the machine learning pipeline is comprised within the ensemble of machine learning pipelines; and
executing, by the system, a machine learning task by employing the ensemble of machine learning pipelines, wherein a weight value delineates an amount of contribution attributed to the machine learning pipeline in executing the machine learning task.

13. The computer-implemented method of claim 9, wherein the selecting the machine learning pipeline is based on a runtime threshold that restricts an amount of time allotted to execution of a machine learning task.

14. A computer program product for generating an automated machine learning process that analyzes time series data, the computer program product comprising a computer readable storage medium having program instructions embodied therewith, the program instructions executable by a processor to cause the processor to:
select, by the processor, a machine learning pipeline for meta transfer learning on the time series data by sequentially allocating subsets of training data from the time series data amongst a plurality of machine learning pipeline candidates, wherein the selecting comprises:
rank, by the processor, the machine learning pipeline amongst the plurality of machine learning pipeline candidates based on meta-data derived from historic execution of the machine learning pipeline and a characteristic of the time series data; and
allocate, by the processor, the subsets of training data using a data allocation using upper bound algorithm, wherein a subset of the subsets is selected based on a chronological order of the subset with respect to a plurality of subsets of the time series data.

15. The computer program product of claim 14, wherein the program instructions further cause the processor to:
depopulate, by the processor, the plurality of machine learning pipeline candidates based on a domain of the time series data.

16. The computer program product of claim 14, wherein the program instructions further cause the processor to:
generate, by the processor, a data request based on a data correlation defined by the machine learning pipeline, wherein the data request regards data relevant to a machine learning task and absent from the time series data.

17. The computer program product of claim 16, wherein the program instructions further cause the processor to:
generate, by the processor, an ensemble of machine learning pipelines selected for the meta transfer learning, wherein the machine learning pipeline is comprised within the ensemble of machine learning pipelines; and
execute, by the processor, the machine learning task by employing the ensemble of machine learning pipelines, wherein a weight value delineates an amount of contribution attributed to the machine learning pipeline in executing the machine learning task.

18. The computer program product of claim 14, wherein the selecting the machine learning pipeline is based on a runtime threshold that restricts an amount of time allotted to execution of a machine learning task.

19. The computer program product of claim 14, wherein the program instructions further cause the processor to:
   configure, by the processor, a hyperparameter employed in the machine learning pipeline.

20. The computer program product of claim 14, wherein the program instructions further cause the processor to:
   engineer, by the processor, a feature of the machine learning pipeline based on a semantic relationship defined within a knowledge database.

* * * * *